(12) United States Patent
Walton et al.

(10) Patent No.: US 7,248,879 B1
(45) Date of Patent: *Jul. 24, 2007

(54) METHOD AND APPARATUS FOR ALLOCATING DOWNLINK RESOURCES IN A MULTIPLE-INPUT MULTIPLE-OUTPUT (MIMO) COMMUNICATION SYSTEM

(75) Inventors: Jay R. Walton, Westford, MA (US); Mark Wallace, Bedford, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 10/696,630

(22) Filed: Oct. 29, 2003

Related U.S. Application Data

(63) Continuation of application No. 09/859,345, filed on May 16, 2001, now Pat. No. 6,662,024.

(51) Int. Cl.
*H04Q 7/20* (2006.01)
(52) U.S. Cl. .................. 455/452.2; 455/562.1
(58) Field of Classification Search ..... 455/450–452.2, 455/561, 562.1, 69, 101–103, 509, 513; 375/347, 375/349; 370/310, 329, 431
See application file for complete search history.

(56) References Cited

U.S. PATENT DOCUMENTS 5,056,109 A 10/1991 Gilhousen et al.
5,265,119 A 11/1993 Gilhousen et al.

(Continued)

FOREIGN PATENT DOCUMENTS

EP 884862 A1 12/1998
EP 966125 A1 12/1999

OTHER PUBLICATIONS

A. Wittneben: "Analysis and Comparison of optimal Predictive Transmitter Selection and Combining Diversity for DECT" Global Telecommunications Conference, 1995. IEEE Singapore Nov. 12-17, 1995; New York, USA, Nov. 13, 1995, pp. 1527-1531.

(Continued)

*Primary Examiner*—Nguyen T. Vo
(74) *Attorney, Agent, or Firm*—Thomas R. Rouse; Charles D. Brown; Thien T. Nguyen

(57) ABSTRACT

Techniques to schedule downlink data transmission to a number of terminals in a wireless communication system. In one method, one or more sets of terminals are formed for possible data transmission, with each set including a unique combination of one or more terminals and corresponding to a hypothesis to be evaluated. One or more sub-hypotheses may further be formed for each hypothesis, with each sub-hypothesis corresponding to specific assignments of a number of transmit antennas to the one or more terminals in the hypothesis. The performance of each sub-hypothesis is then evaluated, and one of the evaluated sub-hypotheses is selected based on their performance. The terminal(s) in the selected sub-hypothesis are then scheduled for data transmission, and data is thereafter coded, modulated, and transmitted to each scheduled terminal from one or more transmit antennas assigned to the terminal.

14 Claims, 9 Drawing Sheets

U.S. PATENT DOCUMENTS

| | | |
|---|---|---|
| 5,799,005 A | 8/1998 | Soliman |
| 5,903,554 A | 5/1999 | Saints |
| 6,097,972 A | 8/2000 | Saints et al. |
| 6,212,242 B1 | 4/2001 | Smith et al. |
| 6,335,922 B1 | 1/2002 | Tiedemann et al. |
| 6,347,235 B1 * | 2/2002 | Angus et al. ............ 455/562.1 |
| 6,473,467 B1 * | 10/2002 | Wallace et al. ............. 375/267 |
| 6,493,331 B1 | 12/2002 | Walton et al. |
| 6,574,211 B2 | 6/2003 | Padovani et al. |
| 6,662,024 B2 * | 12/2003 | Walton et al. ........... 455/562.1 |
| 6,771,987 B1 * | 8/2004 | Dam et al. ............... 455/562.1 |
| 7,006,848 B2 * | 2/2006 | Ling et al. ............... 455/562.1 |
| 2002/0177447 A1 * | 11/2002 | Walton et al. .............. 455/452 |
| 2003/0125040 A1 * | 7/2003 | Walton et al. .............. 455/454 |
| 2003/0128658 A1 * | 7/2003 | Walton et al. .............. 370/208 |
| 2006/0039312 A1 * | 2/2006 | Walton et al. .............. 370/319 |

OTHER PUBLICATIONS

A. Hottinen et al.: "Transmit Diversity by Antenna Selection in CDMA Downlink" IEEE International Symposium on Spread Spectrum Techniques and Applications, vol. 3, Sep. 2, 1998, pp. 767-770.

* cited by examiner

METHOD AND APPARATUS FOR ALLOCATING DOWNLINK RESOURCES IN A MULTIPLE-INPUT MULTIPLE-OUTPUT (MIMO) COMMUNICATION SYSTEM

CLAIM OF PRIORITY UNDER 35 U.S.C. §120

The present application for patent is a Continuation and claims priority to patent application Ser. No. 09/859,345 entitled "METHOD AND APPARATUS FOR ALL ALLOCATING DOWNLINK RESOURCES IN A MULTIPLE-INPUT MULTIPLE-OUTPUT (MIMO) COMMUNICATION SYSTEM" filed May 16, 2001 now U.S. Pat. No. 6,662,024, and assigned to the assignee hereof and hereby expressly incorporated by reference herein.

BACKGROUND

1. Field

The present invention relates generally to data communication, and more specifically to techniques for allocating downlink resources in a multiple-input multiple-output (MIMO) communication system.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques.

A multiple-input multiple-output (MIMO) communication system employs multiple ($N_T$) transmit antennas and multiple ($N_R$) receive antennas for transmission of multiple independent data streams. In one common MIMO system implementation, the data streams are transmitted to a single terminal at any given time. However, a multiple access communication system having a base station with multiple antennas may also concurrently communicate with a number of terminals. In this case, the base station employs a number of antennas and each terminal employs $N_R$ antennas to receive one or more of the multiple data streams.

The connection between a multiple-antenna base station and a single multiple-antenna terminal is called a MIMO channel. A MIMO channel formed by these $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities of these subchannels created by the multiple transmit and receive antennas are utilized.

Each MIMO channel between the base station and a terminal typically experiences different link characteristics and is associated with different transmission capability, so the spatial subchannels available to each terminal have different effective capacities. Efficient use of the available downlink resources (and higher throughput) may be achieved if the $N_C$ available spatial subchannels are effectively allocated such that data is transmitted on these subchannels to a "proper" set of terminals in the MIMO system.

There is therefore a need in the art for techniques to allocate downlink resources in a MIMO system to provide improved system performance.

SUMMARY

Aspects of the invention provide techniques to increase the downlink performance of a wireless communication system. In an aspect, data may be transmitted from a base station to one or more terminals using one of a number of different operating modes. In a MIMO mode, all available downlink data streams are allocated to a single terminal that employs multiple antennas (i.e., a MIMO terminal). In an N-SIMO mode, a single data stream is allocated to each of a number of distinct terminals, with each terminal employing multiple antennas (i.e., SIMO terminals). And in a mixed-mode, the downlink resources may be allocated to a combination of SIMO and MIMO terminals, with both types of terminals being simultaneously supported. By transmitting data simultaneously to multiple SIMO terminals, one or more MIMO terminals, or a combination thereof, the transmission capacity of the system is increased.

In another aspect, scheduling schemes are provided to schedule data transmissions to active terminals. A scheduler selects the best operating mode to use based on various factors such as, for example, the services being requested by the terminals. In addition, the scheduler can perform an additional level of optimization by selecting a particular set of terminals for simultaneous data transmission and assigning the available transmit antennas to the selected terminals such that high system performance and other requirements are achieved. Several scheduling schemes and antenna assignment schemes are provided and described below.

A specific embodiment of the invention provides a method for scheduling downlink data transmission to a number of terminals in a wireless communication system. In accordance with the method, one or more sets of terminals are formed for possible data transmission, with each set including a unique combination of one or more terminals and corresponding to a hypothesis to be evaluated. One or more sub-hypotheses may further be formed for each hypothesis, with each sub-hypothesis corresponding to specific assignments of a number of transmit antennas to the one or more terminals in the hypothesis. The performance of each sub-hypothesis is then evaluated, and one of the evaluated sub-hypotheses is selected based on their performance. The terminal(s) in the selected sub-hypothesis are then scheduled for data transmission, and data is thereafter transmitted to each scheduled terminal from one or more transmit antennas assigned to the terminal.

Each transmit antenna may be used to transmit an independent data stream. To achieve high performance, each data stream may be coded and modulated based on a scheme selected, for example, based on a signal-to-noise-plus-interference (SNR) estimate for the antenna used to transmit the data stream.

Terminals desiring data transmission (i.e., "active" terminals) may be prioritized based on various metrics and factors. The priority of the active terminals may then be used to select which terminal(s) to be considered for scheduling and/or to assign the available transmit antennas to the selected terminals.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
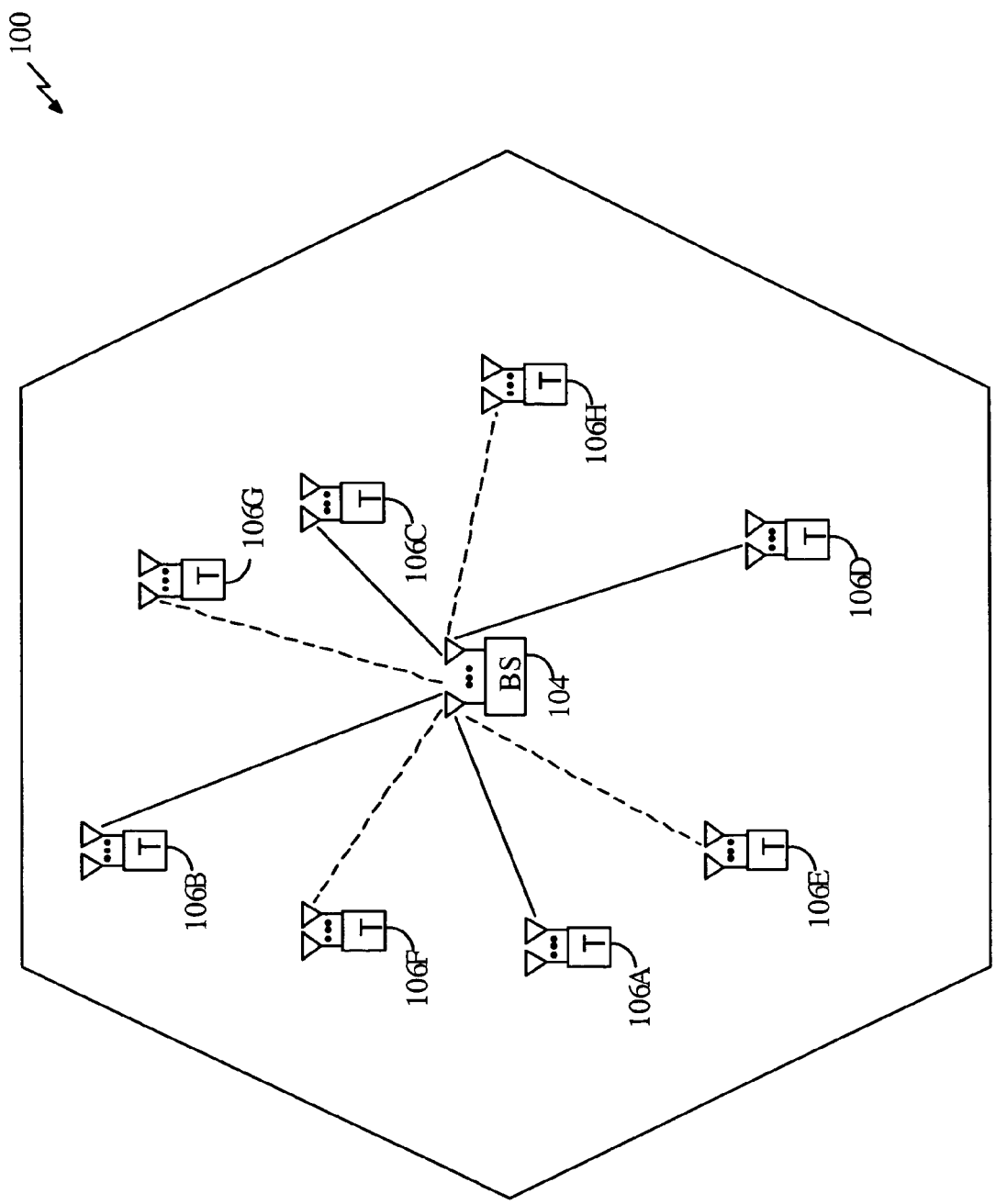
FIG. 1 is a diagram of a multiple-input multiple-output (MIMO) communication system that may be designed and operated to implement various aspects and embodiments of the invention.

FIG. 1 is a diagram of a multiple-input multiple-output (MIMO) communication system 100 that may be designed and operated to implement various aspects and embodiments of the invention. MIMO system 100 employs multiple ($N_T$) transmit antennas and multiple ($N_R$) receive antennas for data transmission. MIMO system 100 is effectively formed for a multiple access communication system having a base station (BS) 104 that can concurrently communicate with a number of terminals (T) 106. In this case, base station 104 employs multiple antennas and represents the multiple-input (MI) for downlink transmissions from the base station to the terminals.

A set of one or more "communicating" terminals 106 collectively represents the multiple-output (MO) for downlink transmissions. As used herein, a communicating terminal is one that receives user-specific data from the base station, and an "active" terminal is one that desires data transmission in an upcoming or future transmission interval. Active terminals may include terminals that are currently communicating.

MIMO system 100 may be designed to implement any number of standards and designs for CDMA, TDMA, FDMA, and other multiple access techniques. The CDMA standards include the IS-95, cdma2000, and W-CDMA standards, and the TDMA standards include the Global System for Mobile Communications (GSM) standard. These standards are known in the art and incorporated herein by reference.

MIMO system 100 may be operated to transmit data via a number of transmission channels. Each terminal 106 communicates with base station 104 via a MIMO channel. A MIMO channel may be decomposed into $N_C$ independent channels, with $N_C \leq \min\{N_T, N_R\}$. Each of the $N_C$ independent channels is also referred to as a spatial subchannel of the MIMO channel. For a MIMO system not utilizing orthogonal frequency division modulation (OFDM), there is typically only one frequency subchannel and each spatial subchannel may be referred to as a "transmission channel". And for a MIMO system utilizing OFDM, each spatial subchannel of each frequency subchannel may be referred to as a transmission channel.

For the example shown in FIG. 1, base station 104 concurrently communicates with terminals 106a through 106d (as indicated by the solid lines) via multiple antennas available at the base station and multiple antennas available at each terminal. Terminals 106e through 106h may receive pilot references and other signaling information from base station 104 (as indicated by the dashed lines), but are not receiving user-specific data from the base station.

Each terminal 106 in MIMO system 100 employs $N_R$ antennas for reception of one or more data streams. Generally, the number of antennas at each terminal is equal to or greater than the number of data streams transmitted by the base station. However, the terminals in the system need not all be equipped with equal number of receive antennas.

For MIMO system 100, the number of antennas at each of the terminals ($N_R$) is typically greater than or equal to the number of antennas at the base station ($N_T$). In this case, for the downlink, the number of spatial subchannels is limited by the number of transmit antennas at the base station. Each transmit antenna may be used to send an independent data stream that may be coded and modulated based on a scheme supported by the spatial subchannel associated with the MIMO channel between the base station and the selected terminal.

Aspects of the invention provide techniques to increase the performance of a wireless communication system. These techniques may be advantageously used to increase the downlink capacity of a multiple access cellular system. These techniques may also be used in combination with other multiple access techniques.

In an aspect, data may be transmitted from a base station to one or more terminals using one of a number of different operating modes. In a MIMO mode, the available downlink resources are allocated to a single terminal (i.e., a MIMO terminal). In an N-SIMO mode, the downlink resources are allocated to a number of distinct terminals, with each terminal demodulating a single data stream (i.e., SIMO terminals). And in a mixed-mode, the downlink resources may be allocated to a combination of SIMO and MIMO terminals, with both types of terminals being simultaneously supported on the same channel, which may be a time slot, a code channel, a frequency subchannel, and so on. By transmitting data simultaneously to multiple SIMO terminals, one or more MIMO terminals, or a combination thereof, the transmission capacity of the system is increased.

In another aspect, scheduling schemes are provided to schedule data transmissions to active terminals. A scheduler selects the best operating mode to use based on various factors such as, for example, the services being requested by the terminals. In addition, the scheduler can perform an additional level of optimization by selecting a particular set of terminals for simultaneous data transmission and assigning the available transmit antennas to the selected terminals such that high system performance and other requirements are achieved. Several scheduling schemes and antenna assignment schemes are described in further detail below.

With MIMO, multiple independent data streams may be transmitted from the base station via multiple transmit antennas to one or more scheduled terminals. If the propagation environment has sufficient scattering, MIMO receiver processing techniques may be used at the terminals to efficiently exploit the spatial dimensionalities of the MIMO channel to increase transmission capacity. MIMO receiver processing techniques may be used when the base station is communicating with multiple terminals simultaneously. From the terminal's perspective, the same receiver processing techniques may be used to process $N_T$ different signals intended for that terminal (e.g., a single MIMO terminal) or just one of the $N_T$ signals (i.e., SIMO terminals).

As shown in FIG. 1, the terminals may be randomly distributed in the base station's coverage area (or "cell") or may be co-located. For a wireless communication system, the link characteristics typically vary over time due to a number of factors such as fading and multipath. At a particular instant in time, the channel response between the base station's array of $N_T$ transmit antennas and the $N_R$ receive antennas for a single terminal may be characterized by a matrix H whose elements are composed of independent Gaussian random variables, as follows:

$$H = [h_1 h_2 \ldots h_{N_T}] = \begin{bmatrix} h_{1,1} & h_{2,1} & \ldots & h_{N_T,1} \\ h_{1,2} & h_{2,2} & \ldots & h_{N_T,2} \\ \vdots & \vdots & & \vdots \\ h_{1,N_R} & h_{2,N_R} & \ldots & h_{N_T,N_R} \end{bmatrix} \quad \text{Eq (1)}$$

where H is the channel response matrix for the terminal, and $h_{i,j}$ is the coupling between the base station's i-th transmit antenna and the terminal's j-th receive antenna.

As shown in equation (1), the channel estimates for each terminal may be represented with a matrix having $N_T \times N_R$ elements corresponding to the number of transmit antennas at the base station and the number of receive antennas at the terminal. Each element of the matrix H describes the response for a respective transmit-receive antenna pair between the base station and one terminal. For simplicity, equation (1) describes a channel characterization based on a flat fading channel model (i.e., one complex value for the entire system bandwidth). In an actual operating environment, the channel may be frequency selective (i.e., channel response varies across the system bandwidth) and a more detailed channel characterization may be used (e.g., each element of the matrix H may include a set of values for different frequency subchannels or time delays).

The active terminals in the MIMO system periodically estimate the channel response for each transmit-receive antenna pair. The channel estimates may be facilitated in a number of ways such as, for example, with the use of pilot and/or data decision directed techniques known in the art. The channel estimates may comprise the complex-value channel response estimate for each transmit-receive antenna pair, as described above in equation (1). The channel estimates give information on the transmission characteristics of each of the spatial subchannels, i.e., what data rate is supportable on each subchannel with a given set of transmission parameters. The information given by the channel estimates may be distilled into a post-processed signal-to-noise-plus-interference ratio (SNR) estimate for each spatial subchannel (described below), or some other statistic that allows the transmitter to select the proper transmission parameters for that spatial subchannel. Typically, this process of derivation of the essential statistic reduces the amount of data required to characterize a channel. In either case, this information represents one form of channel state information (CSI) that may be reported to the base station. Other forms of CSI may also be reported and are described below.

The aggregate CSI received from the collection of terminals may be used to (1) select a "best" set of one or more terminals for data transmission, (2) assign the available transmit antennas to the selected terminals in the set, and (3) select the proper coding and modulation scheme for each transmit antenna. With the available CSI, various scheduling schemes may be designed to maximize the downlink performance by evaluating which specific combination of terminals and antenna assignments provide the best system performance (e.g., the highest throughput) subject to any system constraints and requirements. By exploiting the spatial (and possibly frequency) "signatures" of the individual active terminals (i.e., their channel estimates), the average downlink throughput can be increased.

The terminals may be scheduled for data transmission based on various factors. One set of factors may relate to system constraints and requirements such as the desired quality of service (QoS), maximum latency, average data rate, and so on. Some or all of these factors may need to be satisfied on a per terminal basis (i.e., for each terminal) in a multiple access communication system. Another set of factors may relate to system performance, which may be quantified by an average system throughput rate or some other indications of performance. These various factors are described in further detail below.

The scheduling schemes can be designed to select the best set of terminals for simultaneous data transmission on the available transmission channels such that system performance is maximized while conforming to the system constraints and requirements. For simplicity, various aspects of the invention are described below for a MIMO system without OFDM in which one independent data stream may be transmitted by the base station from each transmit antenna. In this case, (up to) $N_T$ independent data streams may be simultaneously transmitted by the base station from $N_T$ transmit antennas and targeted to one or more terminals, each equipped with $N_R$ receive antennas (i.e., $N_T \times N_R$ MIMO), where $N_R \geq N_T$.

For simplicity, the number of receive antennas is assumed to be equal to the number of transmit antennas (i.e., $N_R = N_T$) for much of the description below. This is not a necessary condition since all of the analysis applies for the case where $N_R \geq N_T$.

Scheduling of data transmission on the downlink comprises two parts: (1) selection of one or more sets of terminals for evaluation, and (2) assignment of the available transmit antennas to the terminals in each set. All or only a subset of the active terminals may be considered for scheduling, and these terminals may be combined to form one or more sets (i.e., hypotheses) to be evaluated. For each hypothesis, the available transmit antennas can be assigned to the terminals in the hypothesis based on any one of a number of antenna assignment schemes. The terminals in the best hypothesis may then be scheduled for data transmission in an upcoming interval. The flexibility in both selecting the best set of terminals for data transmission and the assignment of the transmitted antennas to the selected terminals allows the scheduler to optimize performance by exploiting multi-user diversity environment.

In order to determine the "optimum" transmission to a set of terminals, the SNRs or some other sufficient statistics are provided for each terminal and each spatial subchannel. If the statistic is the SNR, then for each set of terminals to be evaluated for data transmission in an upcoming transmission interval, a hypothesis matrix $\Gamma$ of "post-processed" SNRs (defined below) for this terminal set may be expressed as:

$$\Gamma = \begin{bmatrix} \gamma_{1,1} & \gamma_{2,1} & \cdots & \gamma_{N_T,1} \\ \gamma_{1,2} & \gamma_{2,2} & \cdots & \gamma_{N_T,2} \\ \vdots & \vdots & & \vdots \\ \gamma_{1,N_T} & \gamma_{2,N_T} & \cdots & \gamma_{N_T,N_T} \end{bmatrix}, \quad \text{Eq (2)}$$

where $\gamma_{i,j}$ is the post-processed SNR for a data stream (hypothetically) transmitted from the i-th transmit antenna to the j-th terminal.

In the N-SIMO mode, the $N_T$ rows in the hypothesis matrix $\Gamma$ correspond to $N_T$ vectors of SNRs from $N_T$ different terminals. In this mode, each row in the hypothesis matrix $\Gamma$ gives the SNR of each transmit data stream for one terminal. And in the mixed-mode, for a particular MIMO terminal designated to receive two or more data streams, that terminal's vector of SNRs may be replicated such that the vector appears in as many rows as the number of data streams to be transmitted for the terminal (i.e., one row per data stream). Alternatively, one row in the hypothesis matrix $\Gamma$ may be used for each SIMO or MIMO terminal, and the scheduler may be designed to mark and evaluate these different types of terminals accordingly.

At each terminal in the set to be evaluated, the $N_T$ (hypothetically) transmitted data streams are received by the terminal's $N_R$ receive antennas, and the $N_R$ received signals can be processed using spatial or space-time equalization to separate out the $N_T$ transmitted data streams, as described below. The SNR of a post-processed data stream (i.e., after equalization) may be estimated and comprises the post-processed SNR for that data stream. For each terminal, a set of $N_T$ post-processed SNRs may be provided for the $N_T$ data streams that may be received by that terminal.

If a successive equalization and interference cancellation (or "successive cancellation") receiver processing technique is used at a terminal to process the received signals, then the post-processed SNR achieved at the terminal for each transmitted data stream depends on the order in which the transmitted data streams are detected (i.e., demodulated and decoded) to recover the transmitted data, as described below. In this case, a number of sets of SNRs may be provided for each terminal for a number of possible detection orderings. Multiple hypothesis matrices may then be formed and evaluated to determine which specific combination of terminals and detection ordering provides the best system performance.

In any case, each hypothesis matrix $\Gamma$ includes the post-processed SNRs for a specific set of terminals (i.e., hypothesis) to be evaluated. These post-processed SNRs represent the SNRs achievable by the terminals and are used to evaluate the hypothesis.

Figure 2:
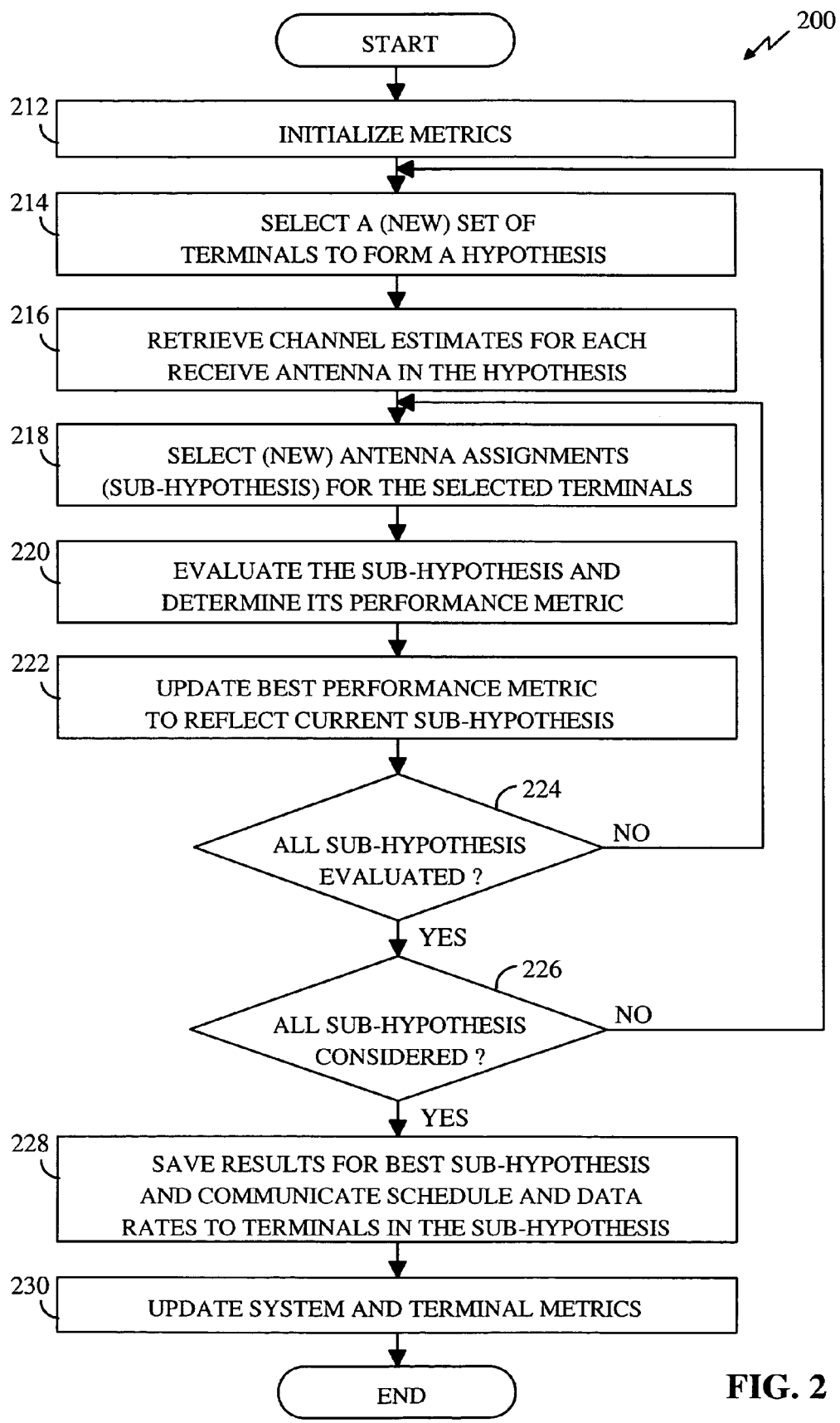
FIG. 2 is a flow diagram of a process to schedule terminals for data transmission, in accordance with an embodiment of the invention.

FIG. 2 is a flow diagram of a process 200 to schedule terminals for data transmission, in accordance with an embodiment of the invention. For clarity, the overall process is first described and the details for some of the steps in the process are described subsequently.

Initially, metrics to be used to select the best set of terminals for data transmission are initialized, at step 212. Various performance metrics may be used to evaluate the terminal sets and some of these are described in further detail below. For example, a performance metric that maximizes system throughput may be used.

A (new) set of one or more active terminals is then selected from among all active terminals considered for scheduling, at step 214. This set of terminals forms a hypothesis to be evaluated. Various techniques may be used to limit the number of active terminals to be considered for scheduling, which then reduces the number of hypotheses to be evaluated, as described below. For each terminal in the hypothesis, the SNR vector (e.g., $\underline{\gamma}_j = [\gamma_{1,j}, \gamma_{2,j}, \ldots \gamma_{N_T,j}]$) is retrieved, at step 216. The SNR vectors for all terminals in the hypothesis form the hypothesis matrix $\Gamma$ shown in equation (2).

For each hypothesis matrix $\Gamma$ of $N_T$ transmit antennas and $N_T$ terminals, there are $N_T$ factorial possible combinations of assignments of transmit antennas to terminals (i.e., $N_T!$ sub-hypotheses). Thus, a particular (new) combination of antenna/terminal assignments is selected for evaluation, at step 218. This particular combination of antenna/terminal assignments forms a sub-hypothesis to be evaluated.

The sub-hypothesis is then evaluated and the performance metric (e.g., the system throughput) corresponding to this sub-hypothesis is determined (e.g., based on the SNRs for the sub-hypothesis), at step 220. This performance metric is then used to update the performance metric corresponding to the current best sub-hypothesis, at step 222. Specifically, if the performance metric for this sub-hypothesis is better than that of the current best sub-hypothesis, then this sub-hypothesis becomes the new best sub-hypothesis, and the performance metric and other terminal metrics corresponding to this sub-hypothesis are saved. The performance and terminal metrics are described below.

A determination is then made whether or not all sub-hypotheses for the current hypothesis have been evaluated, at step 224. If all sub-hypotheses have not been evaluated, the process returns to step 218 and a different and not yet evaluated combination of antenna/terminal assignments is selected for evaluation. Steps 218 through 224 are repeated for each sub-hypothesis to be evaluated.

If all sub-hypotheses for a particular hypothesis have been evaluated, at step 224, a determination is then made whether or not all hypotheses have been considered, at step 226. If all hypotheses have not been considered, then the process returns to step 214 and a different and not yet considered set of terminals is selected for evaluation. Steps 214 through 226 are repeated for each hypothesis to be considered.

If all hypotheses have been considered at step 226, then the specific set of terminals scheduled for data transmission in the upcoming transmission interval and their assigned transmit antennas are known. The post-processed SNRs corresponding to this set of terminals and antenna assignments may be used to select the proper coding and modulation schemes for the data streams to be transmitted to the terminals. The scheduled transmission interval, antenna assignments, coding and modulation schemes, other information, or any combination thereof, may be conveyed to the scheduled terminals (e.g., via a control channel), at step 228. Alternatively, the terminals may perform "blind" detection and attempt to detect all transmitted data streams to determine which ones, if any, of the data streams are intended for them.

If the scheduling scheme requires other system and terminal metrics to be maintained (e.g. the average data rate over the past K transmission intervals, latency for data transmission, and so on), then these metrics are updated, at step 230. The terminal metrics may be used to evaluate the performance of the individual terminals, and are described below. The scheduling is typically performed for each transmission interval.

For a given hypothesis matrix Γ, the scheduler evaluates various combinations of transmit antenna and terminal pairings (i.e., sub-hypotheses) to determine the best assignments for the hypothesis. Various assignment schemes may be used to assign transmit antennas to the terminals to achieve various system goals such as fairness, maximize performance, and so on.

In one antenna assignment scheme, all possible sub-hypotheses are evaluated based on a particular performance metric and the sub-hypothesis with the best performance metric is selected. For each hypothesis matrix Γ, there are $N_T$ factorial (i.e., $N_T!$) possible sub-hypotheses that may be evaluated. Each sub-hypothesis corresponds to a specific assignment of each transmit antenna to a respective terminal. Each sub-hypothesis may thus be represented with a vector of post-processed SNRS, which may be expressed as:

$$\underline{\gamma}_{sub-hyp} = \{\gamma_{1,a}, \gamma_{2,b}, \ldots, \gamma_{N_T,r}\},$$

where $\gamma_{i,j}$ is the post-processed SNR for the i-th transmit antenna to the j-th terminal, and the subscripts {a, b, ... and r} identify the specific terminals in the transmit antenna/terminal pairings for the sub-hypothesis.

Each sub-hypothesis is further associated with a performance metric, $R_{sub-hyp}$, which may be a function of various factors. For example, a performance metric based on the post-processed SNRs may be expressed as:

$$R_{sub-hyp} = f(\underline{\gamma}_{sub-hyp}),$$

where f(•) is a particular positive real function of the argument(s) within the parenthesis.

Various functions may be used to formulate the performance metric. In one embodiment, a function of the achievable throughput for all $N_T$ transmit antennas for the sub-hypothesis may be used, which may be expressed as:

$$f(\underline{\gamma}_{sub-hyp}) = \sum_{i=1}^{N_T} r_i, \quad \text{Eq (3)}$$

where $r_i$ is the throughput associated with the i-th transmit antenna in the sub-hypothesis, and may be expressed as:

$$r_i = c_i \cdot \log_2(1 + \gamma_i), \quad \text{Eq (4)}$$

where $c_i$ is a positive constant that reflects the fraction of the theoretical capacity achieved by the coding and modulation scheme selected for the data stream transmitted on the i-th transmit antenna, and $\gamma_i$ is the post-processed SNR for the i-th data stream.

The first antenna assignment scheme shown in FIG. 2 and described above represents a specific scheme that evaluates all possible combinations of assignments of transmit antennas to terminals. The total number of potential sub-hypotheses to be evaluated by the scheduler for each hypothesis is $N_T!$, which may be large considering that a large number of hypotheses may need to be evaluated. The first scheduling scheme performs an exhaustive search to determine the sub-hypothesis that provides the "optimal" system performance, as quantified by the performance metric used to select the best sub-hypothesis.

A number of techniques may be used to reduce the complexity of the processing to assign transmit antennas. One of these techniques is described below, and others may also be implemented and are within the scope of the invention. These techniques may also provide high system performance while reducing the amount of processing required to assign transmit antennas to terminals.

In a second antenna assignment scheme, a maximum—maximum ("max—max") criterion is used to assign transmit antennas to the terminals in the hypothesis being evaluated. Using this max—max criterion, each transmit antenna is assigned to a particular terminal that achieves the best SNR for the transmit antenna. The antenna assignment is performed for one transmit antenna at a time.

Figure 3:
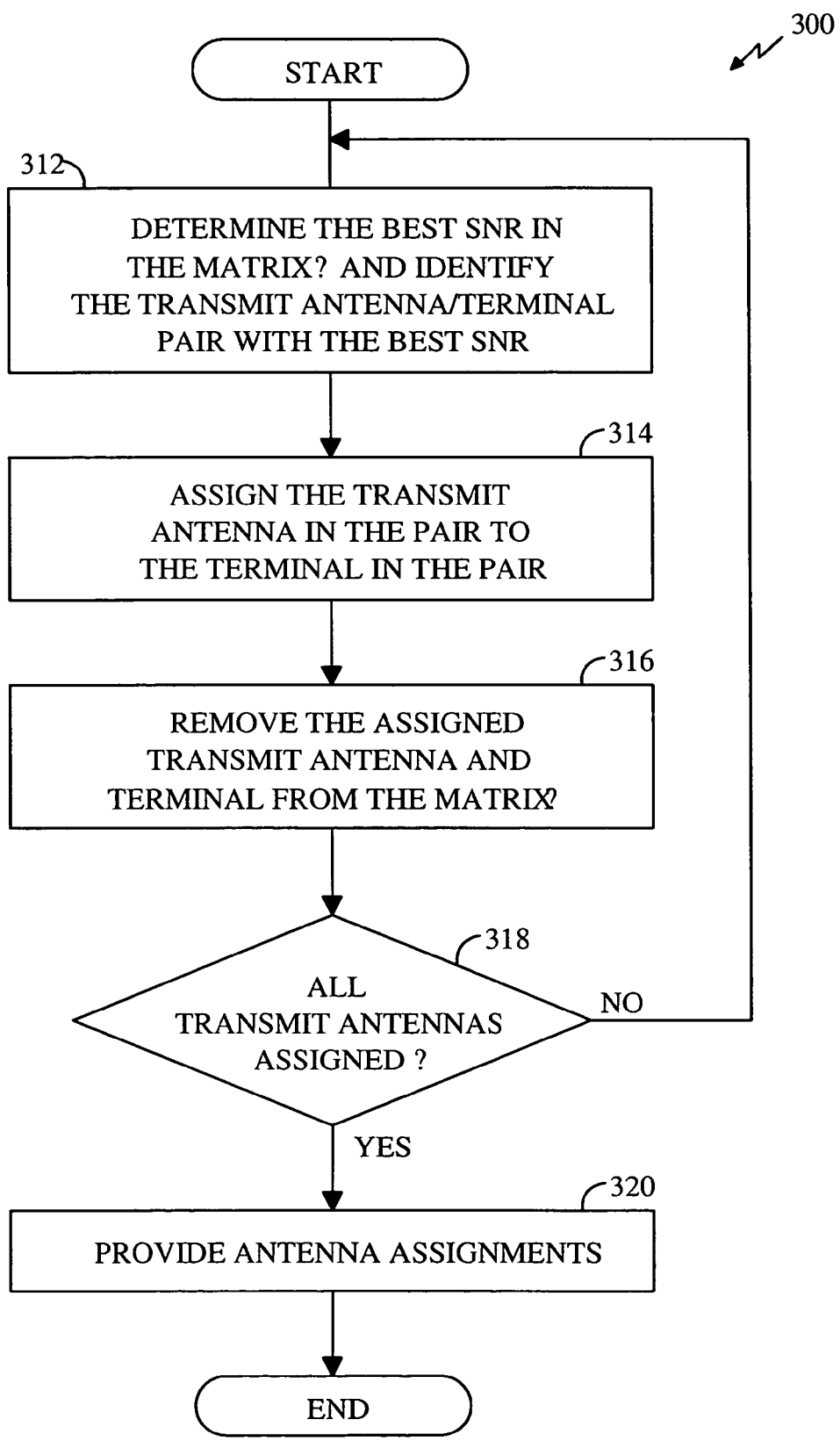
FIG. 3 is a flow diagram of a process to assign transmit antennas to receive antennas using a "max—max" criterion, in accordance with an embodiment of the invention.

FIG. 3 is a flow diagram of a process 300 to assign transmit antennas to terminals using the max—max criterion, in accordance with an embodiment of the invention. The processing shown in FIG. 3 is performed for a particular hypothesis, which corresponds to a specific set of one or more terminals. Initially, the maximum post-processed SNR in the hypothesis matrix Γ is determined, at step 312. This maximum SNR corresponds to a specific transmit antenna/terminal pairing, and the transmit antenna is assigned to this terminal, at step 314. This transmit antenna and terminal are then removed from the matrix Γ, and the matrix is reduced to dimension ($N_T$−1)×($N_T$−1) by removing both the column corresponding to the transmit antenna and the row corresponding to the terminal just assigned, at step 316.

At step 318, a determination is made whether or not all transmit antennas in the hypothesis have been assigned. If all transmit antennas have been assigned, then the antenna assignments are provided, at step 320, and the process terminates. Otherwise, the process returns to step 312 and another transmit antenna is assigned in similar manner.

Once the antenna assignments have been made for a given hypothesis matrix Γ, the performance metric (e.g., the system throughput) corresponding to this hypothesis may be determined (e.g., based on the SNRs corresponding to the antenna assignments), as shown in equations (3) and (4). This performance metric is updated for each hypothesis. When all hypotheses have been evaluated, the best set of terminals and antenna assignments are selected for data transmission in the upcoming transmission interval.

Table 1 shows an example matrix Γ of post-processed SNRs derived by terminals in a 4×4 MIMO system in which the base station includes four transmit antennas and each terminal includes four receive antennas. For the antenna assignment scheme based on the max—max criterion, the best SNR (16 dB) in the original matrix is achieved by transmit antenna 3 and is assigned to terminal 1, as indicated by the shaded box in the third row of the fourth column in the table. Transmit antenna 3 and terminal 1 are then removed from the matrix. The best SNR (14 dB) in the reduced 3×3 matrix is achieved by both transmit antennas 1 and 4, which are respectively assigned to terminals 3 and 2. The remaining transmit antenna 2 is then assigned to terminal 4.

TABLE 1

| SNR (dB) | Transmit Antenna | | | |
|---|---|---|---|---|
| Terminal | 1 | 2 | 3 | 4 |
| 1 | 7 | 9 | 16 | 5 |
| 2 | 8 | 10 | 12 | 14 |
| 3 | 14 | 7 | 6 | 9 |
| 4 | 12 | 10 | 7 | 5 |

Table 2 shows the antenna assignments using the max—max criterion for the example matrix Γ shown in Table 1. For terminal 1, the best SNR (16 dB) is achieved when processing the signal transmitted from transmit antenna 3. The best transmit antennas for the other terminals are also indicated in Table 2. The scheduler can use this information to select the proper coding and modulation scheme to employ for data transmission.

TABLE 2

| Terminal | Transmit Antenna | SNR (dB) |
|---|---|---|
| 1 | 3 | 16 |
| 2 | 4 | 14 |
| 3 | 1 | 14 |
| 4 | 2 | 10 |

The scheduling scheme described in FIGS. 2 and 3 represents a specific scheme that evaluates various hypotheses corresponding to various possible sets of active terminals desiring data transmission in the upcoming transmission interval. The total number of hypotheses to be evaluated by the scheduler can be quite large, even for a small number of active terminals. In fact, the total number of hypotheses, $N_{hyp}$, can be expressed as:

$$N_{hyp} = \binom{N_U}{N_T} = \frac{N_U!}{(N_U - N_T)! N_T!}, \quad \text{Eq (5)}$$

where $N_U$ is the number of active terminals to be considered for scheduling. For example, if $N_U=8$ and $N_T=4$, then $N_{hyp}=70$. An exhaustive search may be used to determine the particular hypothesis (and the particular antenna assignments) that provides the optimal system performance, as quantified by the performance metric used to select the best hypothesis and antenna assignments.

Other scheduling schemes having reduced complexity may also be implemented and are within the scope of the invention. One such scheduling scheme is described below. These schemes may also provide high system performance while reducing the amount of processing required to schedule terminals for data transmission.

In another scheduling scheme, active terminals are scheduled for data transmission based on their priority. The priority of each terminal may be derived based on one or more metrics (e.g., average throughput), system constraints and requirements (e.g., maximum latency), other factors, or a combination thereof, as described below. A list may be maintained for all active terminals desiring data transmission in an upcoming transmission interval (which is also referred to as a "frame"). When a terminal desires data transmission, it is added to the list and its metrics are initialized (e.g., to zero). The metrics of each terminal in the list are thereafter updated on each frame. Once a terminal no longer desires data transmission, it is removed from the list.

For each frame, all or a subset of the terminals in the list may be considered for scheduling. The specific number of terminals to be considered may be based on various factors. In one embodiment, only the $N_T$ highest priority terminals are selected for data transmission. In another embodiment, the highest $N_X$ priority terminals in the list are considered for scheduling, where $N_X > N_T$.

Figure 4:
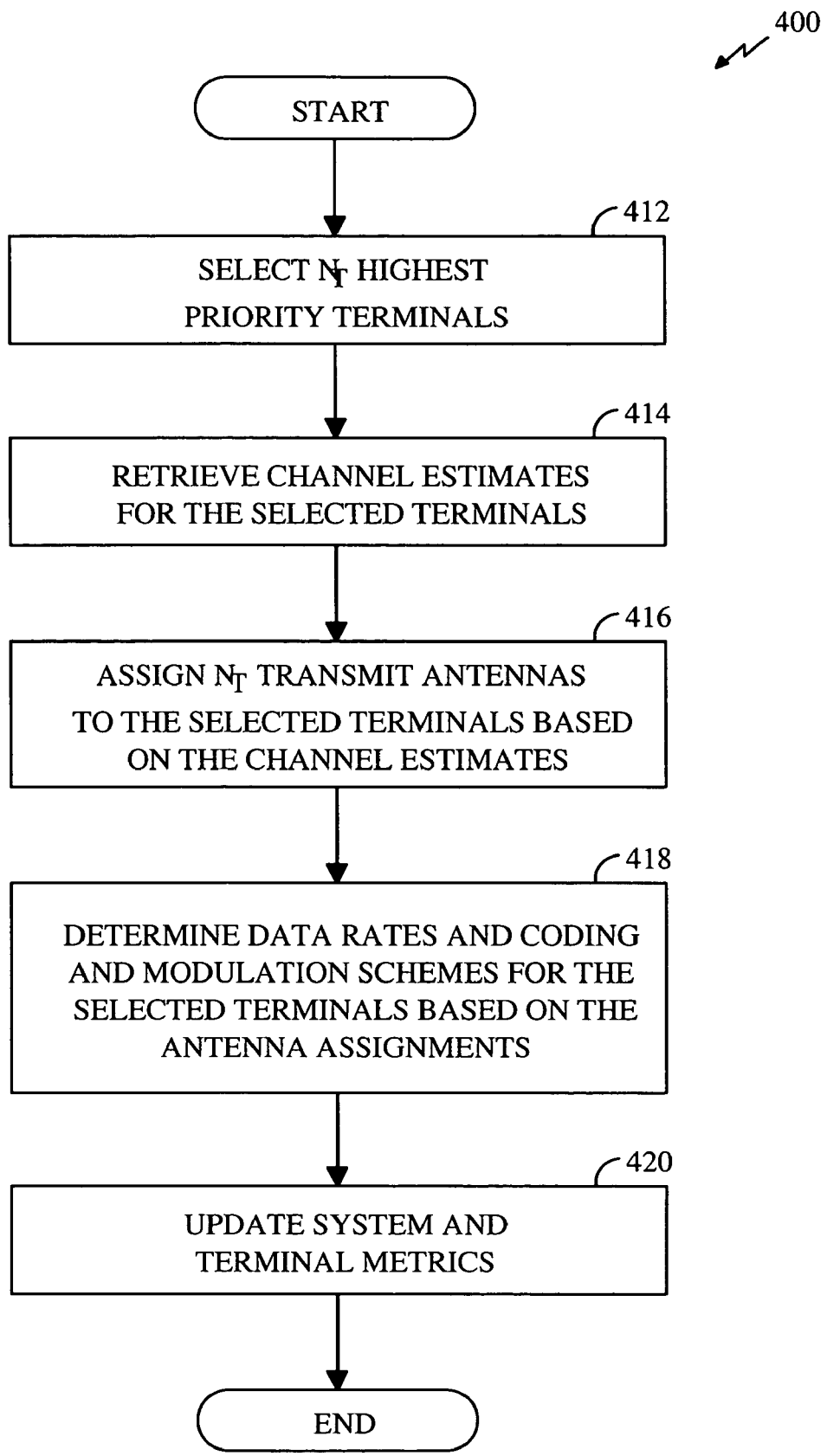
FIG. 4 is a flow diagram for a priority-based scheduling scheme whereby a set of one or more highest priority terminals is considered for scheduling, in accordance with an embodiment of the invention.

FIG. 4 is a flow diagram for a priority-based scheduling scheme 400 whereby a set of $N_T$ highest priority terminals is considered for scheduling, in accordance with an embodiment of the invention. At each frame interval, the scheduler examines the priority for all active terminals in the list and selects the set of $N_T$ highest priority terminals, at step 412. The remaining terminals in the list are not considered for scheduling. The channel estimates for each selected terminal are then retrieved, at step 414. For example, the post-processed SNRs for the selected terminals may be retrieved and used to form the hypothesis matrix Γ.

The $N_T$ transmit antennas are then assigned to the selected terminals based on the channel estimates and using any one of a number of antenna assignment schemes, at step 416. For example, the antenna assignments may be based on an exhaustive search or the max—max criterion described above. In another antenna assignment scheme, the transmit antennas are assigned to the terminals such that their priorities are normalized as close as possible, after the terminal metrics are updated.

The data rates and coding and modulation schemes for the terminals are then determined based on the antenna assignments, at step 418. The scheduled transmission interval and data rates may be reported to the scheduled terminals. The metrics of scheduled (and unscheduled) terminals in the list are updated to reflect the scheduled data transmission (and non-transmission), and system metrics are also updated, at step 420.

Various metrics and factors may be used to determine the priority of the active terminals. In an embodiment, a "score" may be maintained for each terminal in the list and for each metric to be used for scheduling. In one embodiment, a score indicative of an average throughput over a particular averaging time interval is maintained for each active terminal. In one implementation, the score $\phi_n(k)$ for terminal n at frame k is computed as a linear average throughput achieved over some time interval, and can be expressed as:

$$\phi_n(k) = \frac{1}{K} \sum_{i=k-K+1}^{k} r_n(i)/r_{\max}, \quad \text{Eq (6)}$$

where $r_n(i)$ is the realized data rate (in unit of bits/frame) for terminal n at frame i and may be computed as shown in equation (4). Typically, $r_n(i)$ is bounded by a particular maximum achievable data rate, $r_{max}$, and a particular minimum data rate (e.g., zero). In another implementation, the score $\phi_n(k)$ for terminal n in frame k is an exponential average throughput achieved over some time interval, and can be expressed as:

$$\phi_n(k) = (1-\alpha)\cdot\phi_n(k-1)+\alpha\cdot r_n(k)/r_{\max}, \quad \text{Eq (7)}$$

where α is a time constant for the exponential averaging, with a larger value for α corresponding to a longer averaging time interval.

When a terminal desires data transmission, it is added to the list and its score is initialized to zero. The score for each terminal in the list is subsequently updated on each frame. Whenever a terminal is not scheduled for transmission in a frame, its data rate for the frame is set to zero (i.e., $r_n(k)=0$) and its score is updated accordingly. If a frame is received in error by a terminal, the terminal's effective data rate for that frame may be set to zero. The frame error may not be known immediately (e.g., due to round trip delay of an acknowledgment/negative acknowledgment (Ack/Nak) scheme used for the data transmission) but the score can be adjusted accordingly once this information is available.

The priority for the active terminals may also be determined based in part on system constraints and requirements.

For example, if the maximum latency for a particular terminal exceeds a threshold value, then the terminal may be elevated to a high priority.

Other factors may also be considered in determining the priority of the active terminals. One such factor may be related to the type of data to be transmitted to the terminals. Delay sensitive data may be associated with higher priority, and delay insensitive may be associated with lower priority. Retransmitted data due to decoding errors for a prior transmission may also be associated with higher priority since other processes may be awaiting the retransmitted data. Another factor may be related to the type of data service being provided for the terminals. Other factors may also be considered in determining priority and are within the scope of the invention.

The priority of a terminal may thus be a function of any combination of (1) the score maintained for the terminal for each metric to be considered, (2) other parameter values maintained for system constraints and requirements, and (3) other factors. In one embodiment, the system constraints and requirements represent "hard" values (i.e., high or low priority, depending on whether or not the constraints and requirements have been violated) and the scores represent "soft" values. For this embodiment, terminals for which the system constraints and requirements have not been met are immediately considered, along with other terminals based on their scores.

A priority-based scheduling scheme may be designed to achieve equal average throughput (i.e., equal QoS) for all terminals in the list. In this case, active terminals are prioritized based on their achieved average throughput, which may be determined as shown in equation (6) or (7). In this priority-based scheduling scheme, the scheduler uses the scores to prioritize terminals for assignment to the available transmit antennas. The scores of the terminals are updated based on their assignments or non-assignments to transmit antennas. The active terminals in the list may be prioritized such that the terminal with the lowest score is given the highest priority, and the terminal with the highest score is conversely given the lowest priority. Other methods for ranking terminals may also be used. The prioritization may also assign non-uniform weighting factors to the terminal scores.

For a scheduling scheme in which terminals are selected and scheduled for data transmission based on their priority, it is possible for poor terminal groupings to occur occasionally. A "poor" terminal set is one that results in similar channel response matrices $H_k$ which cause similar and poor SNRs for all terminals on all transmit data streams as given in the hypothesis matrix $\Gamma$. This then results in low overall throughput for each terminal in the set. When this happen, the priorities of the terminals may not change substantially over several frames. In this way, the scheduler may be stuck with this particular terminal set until the priorities change sufficiently to cause a change in membership in the set.

To avoid the above-described "clustering" effect, the scheduler can be designed to recognize this condition prior to assigning terminals to the available transmit antennas and/or detect the condition once it has occurred. A number of different techniques may be used to determine the degree of linear dependence in the channel response matrices $H_k$. A simple method of detection is to apply a particular threshold on the hypothesis matrix $\Gamma$. If all SNRs are below this threshold, then the clustering condition is present. In the event that the clustering condition is detected, the scheduler can reorder the terminals (e.g., in a random manner) in an attempt to reduce the linear dependence in the hypothesis matrix. A shuffling scheme may also be devised to force the scheduler to select terminal sets that result in "good" hypothesis matrices (i.e., ones that have minimal amount of linear dependence).

Some of the scheduling schemes described above employ techniques to reduce the amount of processing required to select terminals and assign transmit antennas to the selected terminals. These and other techniques may also be combined to derive other scheduling schemes, and this is within the scope of the invention. For example, the $N_X$ highest priority terminals may be considered for scheduling using any one of the schemes described above.

More complex scheduling schemes may also be devised that may be able to achieve throughput closer to optimum. These schemes may be required to evaluate a larger number of hypotheses and antenna assignments in order to determine the best set of terminals and the best antenna assignments. Other scheduling schemes may also be designed to take advantage of the statistical distribution of the data rates achieved by each terminal. This information may be useful in reducing the number of hypotheses to be evaluated. In addition, for some applications, it may be possible to learn which terminal groupings (i.e., hypotheses) work well by analyzing performance over time. This information may then be stored, updated, and used by the scheduler in future scheduling intervals.

The techniques described above may be used schedule terminals for data transmission using the MIMO mode, N-SIMO mode, and mixed-mode. Other considerations may also be applicable for each of these operating modes, as described below.

MIMO Mode

In the MIMO mode, (up to) $N_T$ independent data streams may be simultaneously transmitted by the base station from $N_T$ transmit antennas and targeted to a single MIMO terminal with $N_R$ receive antennas (i.e., $N_T \times N_R$ MIMO), where $N_R \geq N_T$. The terminal may use spatial equalization (for a non-dispersive MIMO channel with a flat frequency channel response) or space-time equalization (for a dispersive MIMO channel with a frequency dependent channel response) to process and separate the $N_T$ transmitted data streams. The SNR of each post-processed data stream (i.e., after equalization) may be estimated and sent back to the base station as CSI, which then uses the information to select the proper coding and modulation scheme to use on each transmit antenna such that the target terminal is able to detect each transmitted data stream at the desired level of performance.

If all data streams are transmitted to one terminal as is the case in the MIMO mode, then the successive cancellation receiver processing technique may be used at the terminal to process $N_R$ received signals to recover $N_T$ transmitted data streams. This technique successively processes the $N_R$ received signals a number of times (or iterations) to recover the signals transmitted from the terminals, with one transmitted signal being recovered for each iteration. For each iteration, the technique performs linear or non-linear processing (i.e., spatial or space-time equalization) on the $N_R$ received signals to recover one of the transmitted signals, and cancels the interference due to the recovered signal from the received signals to derive "modified" signals having the interference component removed.

The modified signals are then processed by the next iteration to recover another transmitted signal. By removing the interference due to each recovered signal from the received signals, the SNR improves for the transmitted signals included in the modified signals but not yet recovered. The improved SNR results in improved performance for the terminal as well as the system. In fact, under certain operating conditions, the performance achievable with the use of successive cancellation receiver processing in combination with a minimum mean square error (MMSE) spatial equalization is comparable to that with full CSI processing. The successive cancellation receiver processing technique is described in further detail in U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001, assigned to the assignee of the present application and incorporated herein by reference.

In an embodiment, each MIMO terminal in the system estimates and sends back $N_T$ post-processed SNR values for the $N_T$ transmit antennas. The SNRs from the active terminals may be evaluated by the scheduler to determine which terminal to transmit to and when, and the proper coding and modulation scheme to use on a per transmit antenna basis for each selected terminal.

MIMO terminals may be selected for data transmission based on a particular performance metric formulated to achieve the desired system goals. The performance metric may be based on one or more functions and any number of parameters. Various functions may be used to formulate the performance metric, such as the function of the achievable throughput for the MIMO terminals, which is shown above in equations (3) and (4).

N-SIMO Mode

In the N-SIMO mode, (up to) $N_T$ independent data streams may be simultaneously transmitted by the base station from the $N_T$ transmit antennas and targeted to (up to) $N_T$ different SIMO terminals. To maximize performance, the scheduler may consider a large number of possible terminal sets for data transmission. The scheduler then determines the best set of $N_T$ terminals to transmit simultaneously on a given channel (i.e., time slot, code channel, frequency sub-channel, and so on). In a multiple access communication system, there are generally constraints on satisfying certain requirements on a per terminal basis, such as maximum latency or average data rate. In this case, the scheduler can be designed to select the best set of terminals subject to these constraints.

In one implementation for the N-SIMO mode, the terminals use linear spatial equalization to process the receive signals, and the post-processed SNR corresponding to each transmit antenna is provided to the base station. The scheduler then uses the information to select the terminals for data transmission and to assign the transmit antennas to the selected terminals.

In another implementation for the N-SIMO mode, the terminals use successive cancellation receiver processing to process the receive signal to achieved higher post-processed SNRs. With successive cancellation receiver processing, the post-processed SNRs for the transmitted data streams depend on the order in which the data streams are detected (i.e., demodulated and decoded). In some cases, a particular SIMO terminal may not be able to cancel the interference from a given transmitted data stream intended for another terminal, since the coding and modulation scheme used for this data stream was selected based on the other terminal's post-processed SNR. For example, the transmitted data stream may be targeted for terminal $u_x$ and coded and modulated for proper detection at a (e.g., 10 dB) post-processed SNR achievable at the target terminal $u_x$, but another terminal $u_y$ may receive the same transmitted data stream at a worse post-processed SNR and is thus not able to properly detect the data stream. If the data stream intended for another terminal cannot be detected error free, then cancellation of the interference due to this data stream is not possible. Successive cancellation receiver processing is viable when the post-processed SNR corresponding to a transmitted data stream permits reliable detection.

In order for the scheduler to take advantage of the improvement in post-processed SNRs afforded by SIMO terminals using successive cancellation receiver processing, each such terminal can derive the post-processed SNRs corresponding to different possible orderings of detection for the transmitted data streams. The $N_T$ transmitted data streams may be detected based on $N_T$ factorial (i.e., $N_T!$) possible orderings at a SIMO terminal, and each ordering is associated with $N_T$ post-processed SNR values. Thus, $N_T \cdot N_T!$ SNR values may be reported by each active terminal to the base station (e.g., if $N_T=4$, then 96 SNR values may be reported by each SIMO terminal). The scheduler can then use the information to select terminals for data transmission and to further assign transmit antennas to the selected terminals.

If successive cancellation receiver processing is used at the terminals, the scheduler can also consider the possible detection orderings for each terminal. However, a large number of these ordering are typically invalid because a particular terminal may not be able to properly detect data streams transmitted to other terminals due to the lower post-processed SNRs achieved at this terminal for the undetectable data streams.

As noted above, the transmit antennas may be assigned to the selected terminals based on various schemes. In one antenna assignment scheme, the transmitted antennas are assigned to achieve high system performance and based on the priority of the terminals.

Table 3 shows an example of the post-processed SNRs derived by each terminal in a hypothesis being considered. For terminal 1, the best SNR is achieved when detecting the data stream transmitted from transmit antenna 3, as indicated by the shaded box in row 3, column 4 of the table. The best transmit antennas for other terminals in the hypothesis are also indicated by the shading in the boxes.

TABLE 3

| SNR (dB) | Transmit Antenna | | | |
|---|---|---|---|---|
| Terminal | 1 | 2 | 3 | 4 |
| 1 | 7 | 9 | 16 | 5 |
| 2 | 8 | 10 | 12 | 14 |
| 3 | 14 | 7 | 6 | 9 |
| 4 | 12 | 10 | 7 | 5 |

If each terminal identifies a different transmit antenna from which the best post-processed SNR is detected, then the transmit antennas may be assigned to the terminals based on the their best post-processed SNRs. For the example shown in Table 3, terminal 1 may be assigned to transmit antenna 3, and terminal 2 may be assigned to transmit antenna 2.

If more than one terminal prefers the same transmit antenna, then the scheduler can determine the antenna assignments based on various criteria (e.g., fairness, performance metric, and others). For example, Table 3 indicates that the best post-processed SNRs for terminals 3 and 4 occur for the data stream transmitted from the same transmit antenna 1. If the objective is to maximize throughput, then the scheduler may assign transmit antenna 1 to terminal 3 and transmit antenna 2 to terminal 4. However, if antennas are assigned to achieve fairness, then transmit antenna 1 may be assigned to terminal 4 if terminal 4 has higher priority than terminal 3.

Mixed-Mode

The techniques described above can be generalized to handle mixed SIMO and MIMO terminals. For example, if four transmit antennas are available at the base station, then four independent data streams may be transmitted to a single 4×4 MIMO terminal, two 2×4 MIMO terminals, four 1×4 SIMO terminals, one 2×4 MIMO terminal plus two 1×4 SIMO terminals, or any other combination of terminals designated to receive a total of four data streams. The scheduler can be designed to select the best combination of terminals based on the post-processed SNRs for various hypothesized sets of terminals, where each hypothesized set may include a mixture of both MIMO and SIMO terminals.

Whenever mixed-mode traffic is supported, the use of successive cancellation receiver processing by the (e.g., MIMO) terminals places additional constraints on the scheduler due to the dependencies introduced. These constraints may result in more hypothesized sets being evaluated, since in addition to considering different sets of terminals the scheduler must also consider demodulation of the data streams in various orders by each terminal. The assignment of the transmit antennas and the selection of the coding and modulation schemes would then take into account these dependencies in order to achieve improved performance.

Transmit Antennas

The set of transmit antennas at a base station may be a physically distinct set of "apertures", each of which may be used to directly transmit a respective data stream. Each aperture may be formed by a collection of one or more antenna elements that are distributed in space (e.g., physically located at a single site or distributed over multiple sites). Alternatively, the antenna apertures may be preceded by one or more (fixed) beam-forming matrices, with each matrix being used to synthesize a different set of antenna beams from the set of apertures. In this case, the above description for the transmit antennas applies analogously to the transformed antenna beams.

A number of fixed beam-forming matrices may be defined in advance, and the terminals may evaluate the post-processed SNRs for each of the possible matrices (or sets of antenna beams) and send SNR vectors back to the base station. Different performance (i.e., post-processed SNRs) is typically achieved for different sets of transformed antenna beams, and this is reflected in the reported SNR vectors. The base station may then perform scheduling and antenna assignment for each of the possible beam-forming matrices (using the reported SNR vectors), and select a particular beam-forming matrix as well as a set of terminals and their antenna assignments that achieve the best use of the available resources.

The use of beam-forming matrices affords additional flexibility in scheduling terminals and may further provide improved performance. As examples, the following situations may be well suited for beam-forming transformations:

Correlation in the MIMO channel is high so that the best performance may be achieved with a small number of data streams. However, transmitting with only a subset of the available transmit antennas (and using only their associated transmit amplifiers) results in a smaller total transmit power. A transformation may be selected to use most or all of the transmit antennas (and their amplifiers) for the data streams to be sent. In this case, higher transmit power is achieved for the transmitted data streams.

Physically dispersed terminals may be isolated somewhat by their locations. In this case, the terminals may be served by a standard FFT-type transformation of horizontally spaced apertures into a set of beams pointed at different azimuths.

Performance

The techniques described herein may be viewed as a particular form of spatial division multiple access (SDMA) wherein each transmit antenna in the base station's antenna array is used to transmit a different data stream using channel state information (e.g., SNRs or some other sufficient parameter which determines the supportable data rate) derived by the terminals in the coverage area. High performance is achieved on the basis of the CSI, which is used in scheduling terminals and processing data.

The techniques described herein can provide improved system performance (e.g., higher throughput). Simulations have been performed to quantify the possible system throughput with some of these techniques. In the simulations, the channel response matrices $H_k$ coupling the array of transmit antennas and the receive antennas of the k-th terminal is assumed to be composed of equal-variance, zero-mean complex Gaussian random variables. The simulations were performed for the MIMO and N-SIMO modes.

In the MIMO mode, four MIMO terminals (each with four receive antennas) are considered for each realization (e.g., each transmission interval) and the best terminal is selected and scheduled for data transmission. The scheduled terminal is transmitted four independent data streams and uses successive cancellation receiver processing (with MMSE equalization) to process the received signals and recover the transmitted data streams. The average throughput for the scheduled MIMO terminals is recorded.

In the N-SIMO mode, four SIMO terminals, each with four receive antennas, are considered for each realization. The post-processed SNRs for each SIMO terminal are determined using MMSE linear spatial equalization (without successive cancellation receiver processing). The transmit antennas are assigned to the selected terminals based on the max—max criterion. The four scheduled terminals are transmitted four independent data streams and each terminal uses MMSE equalization to process the receive signal and recover its data stream. The throughputs for each scheduled SIMO terminal are separately recorded, and the average throughput for all scheduled terminals is also recorded.

Figure 9:
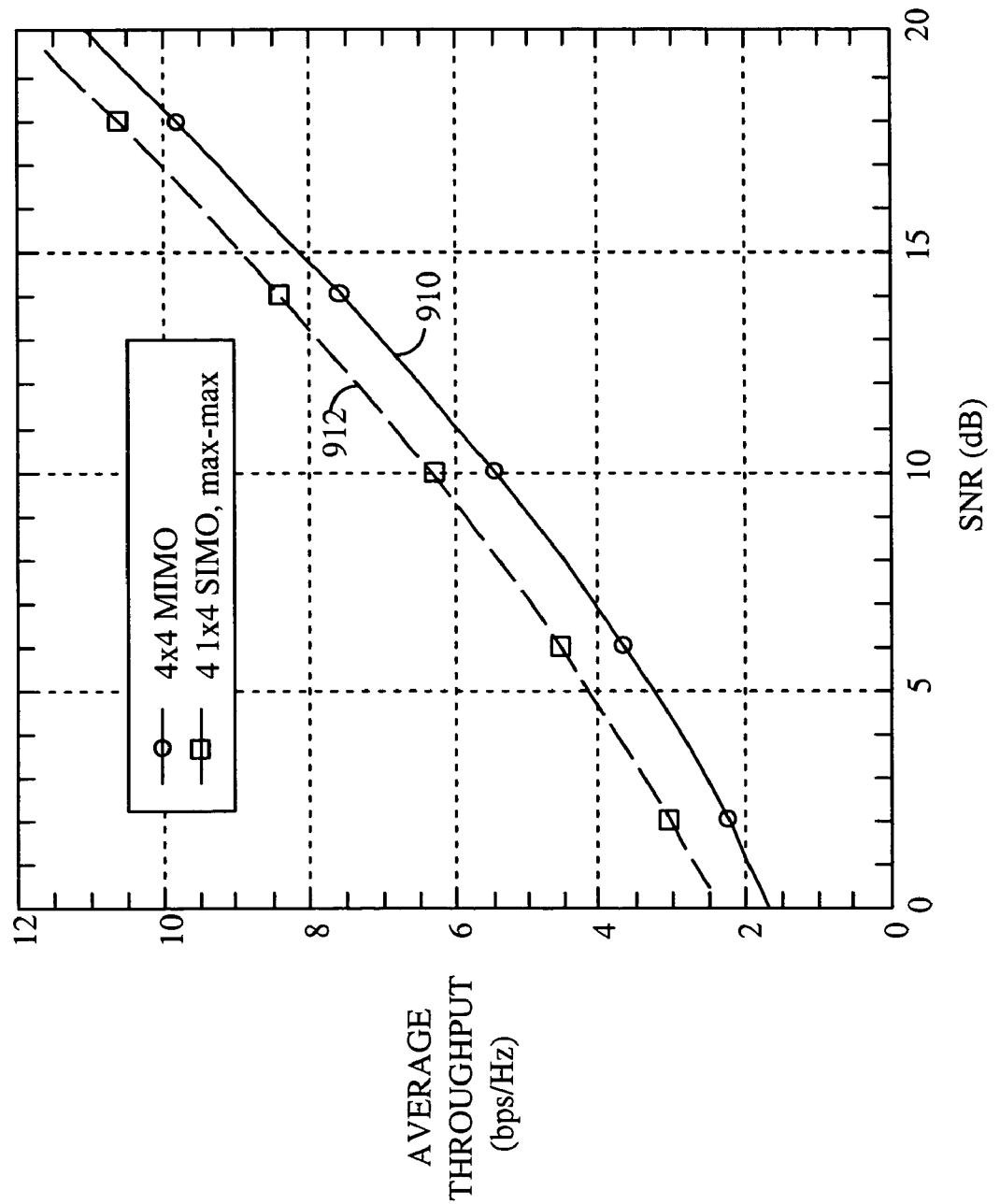
FIG. 9 shows the average throughput for a MIMO communication system with four transmit antennas (i.e., $N_T=4$) and four receive antennas at each terminal (i.e., $N_R=4$) for two different operating modes.

FIG. 9 shows the average throughput for a MIMO communication system with four transmit antennas (i.e., $N_T=4$) and four receive antennas per terminal (i.e., $N_R=4$) for the MIMO and N-SIMO modes. The simulated throughput associated with each operating mode is provided as a function of the average post-processed SNR. The average throughput for the MIMO mode is shown as plot 910, and the average throughput for the N-SIMO mode is shown as plot 912.

As shown in FIG. 9, the simulated throughput associated with the N-SIMO mode using the max—max criterion antenna assignment shows better performance than that achieved for the MIMO mode. In the MIMO mode, the MIMO terminals benefit by using successive cancellation receiver processing to achieve higher post-processed SNRs. In the SIMO mode, the scheduling schemes are able to exploit multi-user selection diversity to achieve improved performance (i.e., higher throughput) even though each SIMO terminal uses linear spatial equalization. In fact, the multi-user diversity provided in the N-SIMO mode results in an average downlink throughput that exceeds the throughput achieved by dividing a transmission interval into four equal-duration sub-slots and assigning each MIMO terminal to a respective sub-slot.

The scheduling schemes used in the simulations for both operating modes were not designed to provide proportionate fairness and some terminals will observe higher average throughput than others. When a fairness criterion is imposed, the differences in throughput for the two operating modes may diminish. Nevertheless, the ability to accommodate both MIMO and N-SIMO terminals provides added flexibility to the provisioning of wireless data services.

For simplicity, various aspects and embodiments of the invention have been described for a communication system in which (1) the number of receive antennas is equal to the number of transmit antennas (i.e., $N_R=N_T$), and (2) one data stream is transmitted from each antenna at the base station. In this case, the number of transmission channels is equal to the number of available spatial subchannels of the MIMO channel. For a MIMO system that utilizes OFDM, multiple frequency subchannels may be associated with each spatial subchannel, and these frequency subchannels may be assigned to terminals based on the techniques described above. For a dispersive channel, a matrix H would represent a three-dimensional cube of channel response estimates for each terminal.

Each scheduled terminal may also be equipped with more receive antennas than the total number of data streams. Moreover, multiple terminals may share a given transmit antenna, and the sharing may be achieved via time division multiplexing (e.g., assigning different fractions of a transmission interval to different terminals), frequency division multiplexing (e.g., assigning different frequency subchannels to different terminals), code division multiplexing (e.g., assigning different orthogonal codes to different terminals), some other multiplexing schemes, or any combinations of these schemes.

The scheduling schemes described herein select terminals and assign antennas for data transmission based on channel state information (e.g., post-processed SNRs). The post-processed SNRs for the terminals are dependent on the particular transmit power level used for the data streams transmitted from the base station. For simplicity, the same transmit power level is assumed for all data streams (i.e., no power control of the transmit power). However, by controlling the transmit power for each antenna, the achievable SNRs may be adjusted. For example, by decreasing the transmit power for a particular transmit antenna via power control, the SNR associated with a data stream transmitted from this antenna is reduced, the interference caused by this data stream on other data streams would also be reduced, and other data streams may be able to achieve better SNRs. Thus, power control may also be used in conjunction with the scheduling schemes described herein, and this is within the scope of the invention.

The scheduling of terminals based on priority is also described in U.S. Pat. No. 6,335,922 issued Jan. 1, 2002 to Tiedemann et al., entitled "METHOD AND APPARATUS FOR DETERMINING AVAILABLE TRANSMIT POWER IN A WIRELESS COMMUNICATION SYSTEM," filed Sep. 29, 2000. Scheduling of data transmission for the downlink is also described in U.S. patent application Ser. No. 08/798,951, entitled "METHOD AND APPARATUS FOR FORWARD LINK RATE SCHEDULING," filed Feb. 11, 1997. These applications are assigned to the assignee of the present invention and incorporated herein by reference.

The scheduling schemes described herein incorporate a number of features and provide numerous advantages. Some of these features and advantages are described below.

First, the scheduling schemes support various operating modes, including mix-mode whereby any combination of SIMO and MIMO terminals may be scheduled for data transmission on the downlink. Each SIMO or MIMO terminal is associated with an SNR vector (i.e., one row in equation (2)). The scheduling schemes can evaluate any number of possible combinations of terminals for data transmission.

Second, the scheduling schemes provide a schedule for each transmission interval that includes a set of (optimal or near optimal) "mutually compatible" terminals based on their spatial signatures. Mutual compatibility may be taken to mean coexistence of transmission on the same channel and at the same time given specific constraints regarding terminals data rate requirements, transmit power, link margin, capability between SIMO and MIMO terminals, and possibly other factors.

Third, the scheduling schemes support variable data rate adaptation based on the post-processed SNRs achieved at the terminals. Each scheduled terminal may be informed when to expect data transmission, the assigned transmit antenna(s), and the data rate(s) to for the data transmission (e.g., on a per transmit antenna basis).

Fourth, the scheduling schemes can be designed to consider sets of terminals that have similar link margins. Terminals may be grouped according to their link margin properties. The scheduler may then consider combinations of terminals in the same "link margin" group when searching for mutually compatible spatial signatures. This grouping according to link margin may improve the overall spectral efficiency of the scheduling schemes compared to that achieved by ignoring the link margins. Moreover, by scheduling terminals with similar link margins to transmit, downlink power control may be more easily exercised (e.g., on the entire set of terminals) to improve overall spectral reuse. This may be viewed as a combination of a downlink adaptive reuse scheduling in combination with SDMA for SIMO/MIMO. Scheduling based on link margins is described in further detail in U.S. Pat. No. 6,493,331, issued Dec. 10, 2002 to Walton, et al., entitled "METHOD AND APPARATUS FOR CONTROLLING TRANSMISSIONS OF A COMMUNICATIONS SYSTEM," filed Mar. 30, 2000, and U.S. patent application Ser. No. 09/848,937, entitled "METHOD AND APPARATUS FOR CONTROLLING UPLINK TRANSMISSIONS OF A WIRELESS COMMUNICATION SYSTEM," filed May 3, 2001, both assigned to the assignee of the present application and incorporated herein by reference.

MIMO Communication System

Figure 5:
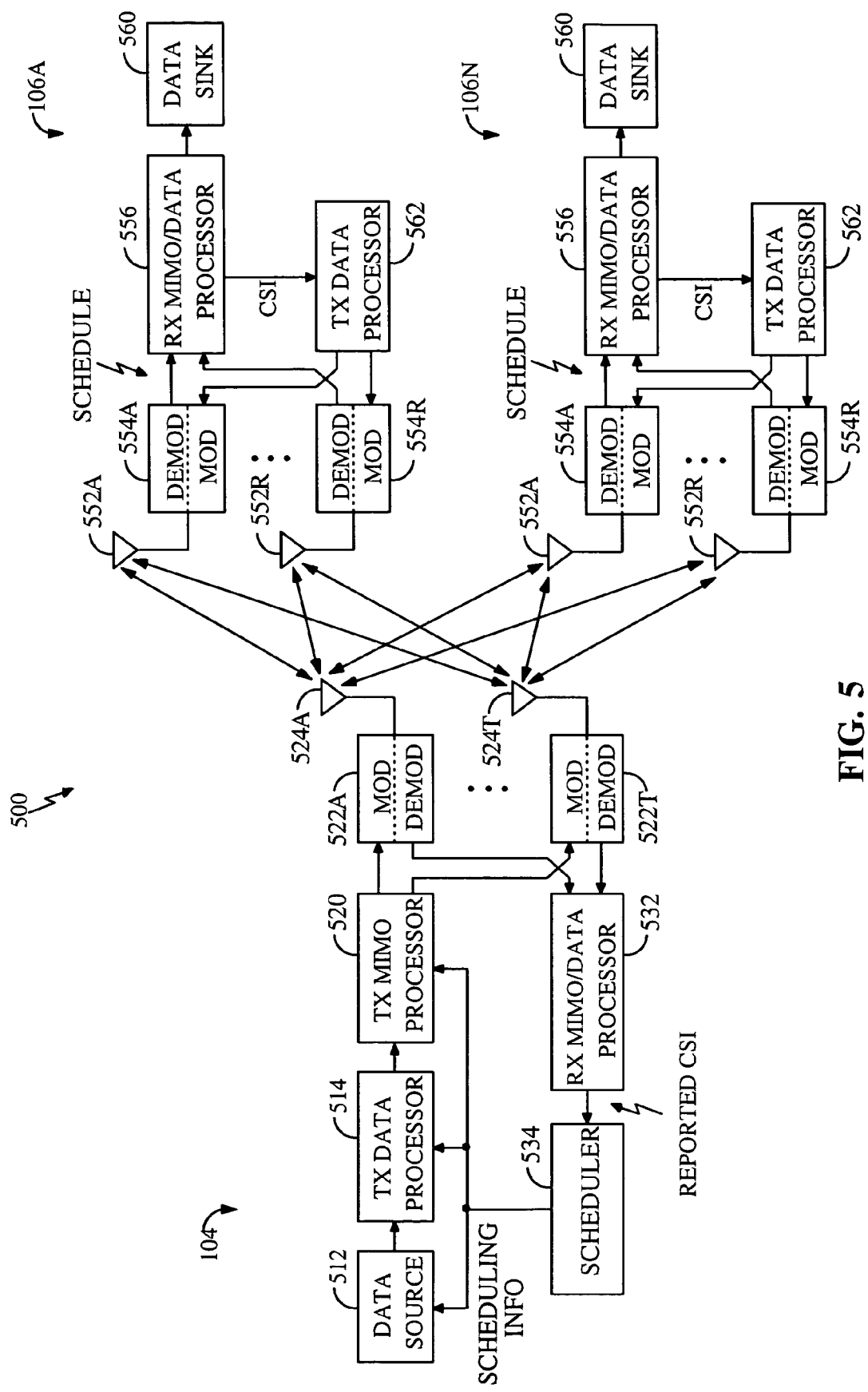
FIG. 5 is a block diagram of a base station and a number of terminals in the MIMO communication system.

FIG. 5 is a block diagram of base station 104 and terminals 106 within MIMO communication system 100. At base station 104, a data source 512 provides data (i.e., information bits) to a transmit (TX) data processor 514. For each transmit antenna, TX data processor 514 (1) encodes the data in accordance with a particular coding scheme, (2) interleaves (i.e., reorders) the encoded data based on a particular interleaving scheme, and (3) maps the interleaved bits into modulation symbols for one or more transmission channels selected for data transmission. The encoding increases the reliability of the data transmission. The interleaving provides time diversity for the coded bits, permits the data to be transmitted based on an average SNR for the transmit antenna, combats fading, and further removes correlation between coded bits used to form each modulation symbol. The interleaving may further provide frequency diversity if the coded bits are transmitted over multiple frequency subchannels. In an aspect, the coding and symbol mapping may be performed based on control signals provided by a scheduler 534.

The encoding, interleaving, and signal mapping may be achieved based on various schemes. Some such schemes are described in the aforementioned U.S. patent application Ser. No. 09/854,235; U.S. patent application Ser. No. 09/816,481, entitled "METHOD AND APPARATUS FOR UTILIZING CHANNEL STATE INFORMATION IN A WIRELESS COMMUNICATION SYSTEM," filed Mar. 23, 2001; and U.S. patent application Ser. No. 09/776,073, entitled "CODING SCHEME FOR A WIRELESS COMMUNICATION SYSTEM," filed Feb. 1, 2001, all assigned to the assignee of the present application and incorporated herein by reference.

A TX MIMO processor 520 receives and demultiplexes the modulation symbols from TX data processor 514 and provides a stream of modulation symbols for each transmission channel (e.g., each transmit antenna), one modulation symbol per time slot. TX MIMO processor 520 may further precondition the modulation symbols for each selected transmission channel if full CSI (e.g., the channel response matrix H) is available. MIMO and full-CSI processing is described in further detail in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, assigned to the assignee of the present application and incorporated herein by reference.

If OFDM is not employed, TX MIMO processor 520 provides a stream of modulation symbols for each antenna used for data transmission. And if OFDM is employed, TX MIMO processor 520 provides a stream of modulation symbol vectors for each antenna used for data transmission. And if full-CSI processing is performed, TX MIMO processor 520 provides a stream of preconditioned modulation symbols or preconditioned modulation symbol vectors for each antenna used for data transmission. Each stream is then received and modulated by a respective modulator (MOD) 522 and transmitted via an associated antenna 524.

At each scheduled terminal 106, a number of receive antennas 552 receive the transmitted signals, and each receive antenna provides a received signal to a respective demodulator (DEMOD) 554. Each demodulator (or frontend unit) 554 performs processing complementary to that performed at modulator 522. The modulation symbols from all demodulators 554 are then provided to a receive (RX) MIMO/data processor 556 and processed to recover one or more data streams transmitted for the terminal. RX MIMO/data processor 556 performs processing complementary to that performed by TX data processor 514 and TX MIMO processor 520 and provides decoded data to a data sink 560. The processing by terminal 106 is described in further detail in the aforementioned U.S. patent application Ser. Nos. 09/854,235 and 09/776,073.

At each active terminal 106, RX MIMO/data processor 556 further estimates the link conditions and provides CSI (e.g., post-processed SNRs or channel gain estimates). A TX data processor 562 then receives and processes the CSI, and provides processed data indicative of the CSI to one or more modulators 554. Modulator(s) 554 further condition the processed data and transmit the CSI back to base station 104 via a reverse channel. The CSI may be reported by the terminal using various signaling techniques (e.g., in full, differentially, or a combination thereof), as described in the aforementioned U.S. patent application Ser. No. 09/816,481.

At base station 104, the transmitted feedback signal is received by antennas 524, demodulated by demodulators 522, and provided to a RX data/MIMO processor 532. RX data/MIMO processor 532 performs processing complementary to that performed by TX data processor 562 and recovers the reported CSI, which is then provided to scheduler 534.

Scheduler 534 uses the reported CSI to perform a number of functions such as (1) selecting the set of best terminals for data transmission, (2) assigning the available transmit antennas to the selected terminals, and (3) determining the coding and modulation scheme to be used for each assigned transmit antenna. Scheduler 534 may schedule terminals to achieve high throughput or based on some other performance criteria or metrics, as described above. In FIG. 5, scheduler 534 is shown as being implemented within base station 104. In other implementation, scheduler 534 may be implemented within some other element of communication system 100 (e.g., a base station controller that couples to and interacts with a number of base stations).

Figure 6:
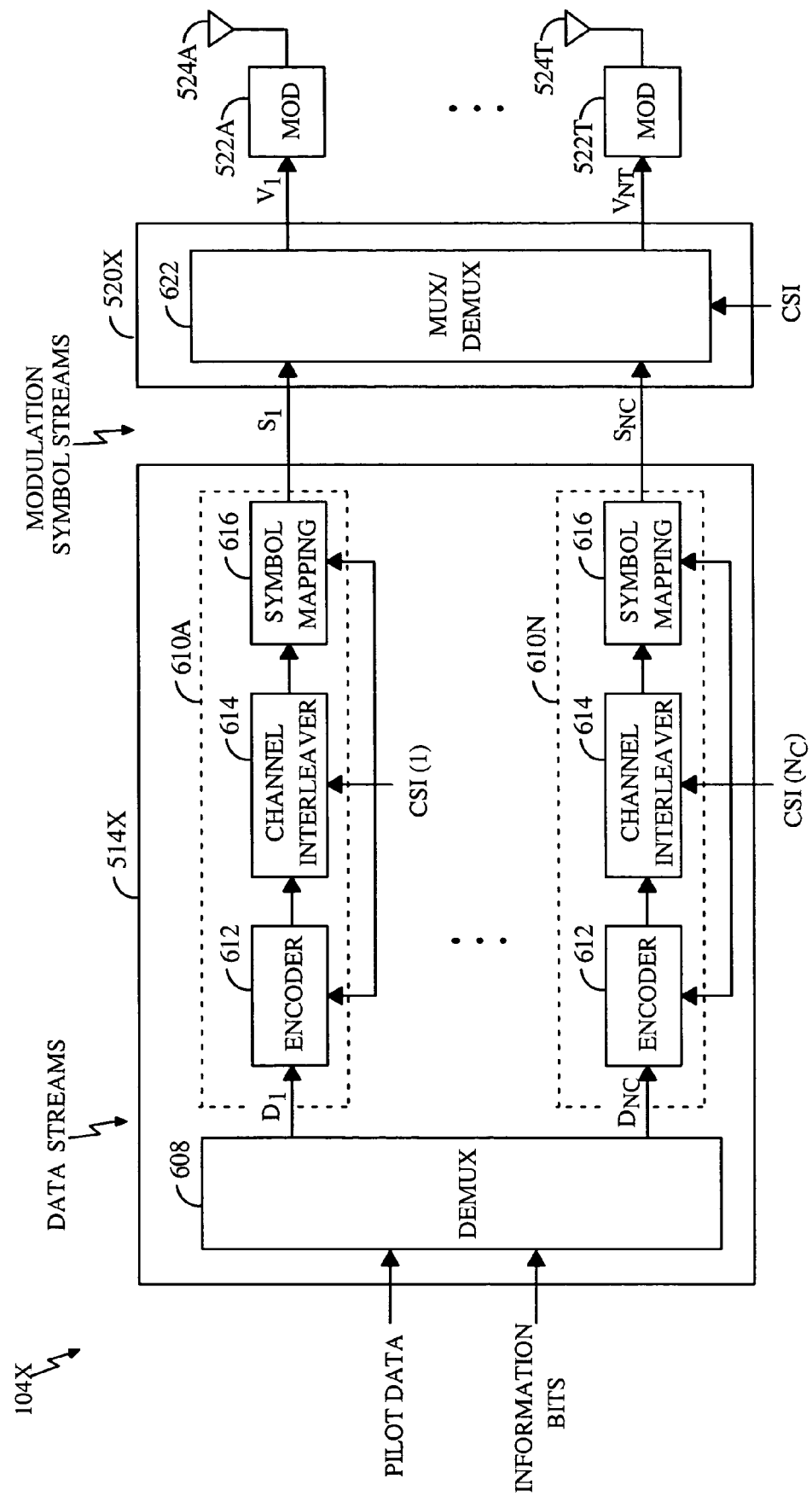
FIG. 6 is a block diagram of an embodiment of the transmit portion of a base station capable of processing data for transmission to the terminals based on the available CSI.

FIG. 6 is a block diagram of an embodiment of a base station 104x capable of processing data for transmission to the terminals based on CSI available to the base station (e.g., as reported by the terminals). Base station 104x is one embodiment of the transmitter portion of base station 104 in FIG. 5. Base station 104x includes (1) a TX data processor 514x that receives and processes information bits to provide modulation symbols and (2) a TX MIMO processor 520x that demultiplexes the modulation symbols for the $N_T$ transmit antennas.

In the specific embodiment shown in FIG. 6, TX data processor 514x includes a demultiplexer 608 coupled to a number of channel data processors 610, one processor for each of the $N_C$ transmission channels. Demultiplexer 608 receives and demultiplexes the aggregate information bits into a number of (up to $N_C$) data streams, one data stream for each of the transmission channels to be used for data transmission. Each data stream is provided to a respective channel data processor 610.

In the embodiment shown in FIG. 6, each channel data processor 610 includes an encoder 612, a channel interleaver 614, and a symbol mapping element 616. Encoder 612 receives and encodes the information bits in the received data stream in accordance with a particular coding scheme to provide coded bits. Channel interleaver 614 interleaves the coded bits based on a particular interleaving scheme to provide time diversity. And symbol mapping element 616 maps the interleaved bits into modulation symbols for the transmission channel used for transmitting the data stream.

Pilot data (e.g., data of known pattern) may also be encoded and multiplexed with the processed information bits. The processed pilot data may be transmitted (e.g., in a time division multiplexed (TDM) manner) in all or a subset of the transmission channels used to transmit the information bits. The pilot data may be used at the terminals to perform channel estimation.

As shown in FIG. 6, the data encoding, interleaving, and modulation (or a combination thereof) may be adjusted based on the available CSI (e.g., as reported by the terminals). In one coding and modulation scheme, adaptive encoding is achieved by using a fixed base code (e.g., a rate 1/3 Turbo code) and adjusting the puncturing to achieve the desired code rate, as supported by the SNR of the transmission channel used to transmit the data. For this scheme, the puncturing may be performed after the channel interleaving. In another coding and modulation scheme, different coding schemes may be used based on the reported CSI. For example, each of the data streams may be coded with an independent code. With this scheme, a successive cancellation receiver processing scheme may be used at the terminals to detect and decode the data streams to derive a more reliable estimate of the transmitted data streams, as described in further detail below.

Symbol mapping element 616 can be designed to group sets of interleaved bits to form non-binary symbols, and to map each non-binary symbol into a point in a signal constellation corresponding to a particular modulation scheme (e.g., QPSK, M-PSK, M-QAM, or some other scheme) selected for the transmission channel. Each mapped signal point corresponds to a modulation symbol. The number of information bits that may be transmitted for each modulation symbol for a particular level of performance (e.g., one percent packet error rate (PER)) is dependent on the SNR of the transmission channel. Thus, the coding and modulation scheme for each transmission channel may be selected based on the available CSI. The channel interleaving may also be adjusted based on the available CSI.

The modulation symbols from TX data processor 514x are provided to TX MIMO processor 520x, which is one embodiment of TX MIMO processor 520 in FIG. 5. Within TX MIMO processor 520x, a demultiplexer 622 receives (up to) $N_C$ modulation symbol streams from $N_C$ channel data processors 610 and demultiplexes the received modulation symbols into a number of ($N_T$) modulation symbol streams, one stream for each antenna used to transmit the modulation symbols. Each modulation symbol stream is provided to a respective modulator 522. Each modulator 522 converts the modulation symbols into an analog signal, and further amplifies, filters, quadrature modulates, and upconverts the signal to generate a modulated signal suitable for transmission over the wireless link.

A transmitter design that implements OFDM is described in the aforementioned U.S. patent application Ser. Nos. 09/854,235, 09/816,481, 09/776,073, and 09/532,492.

Figure 7:
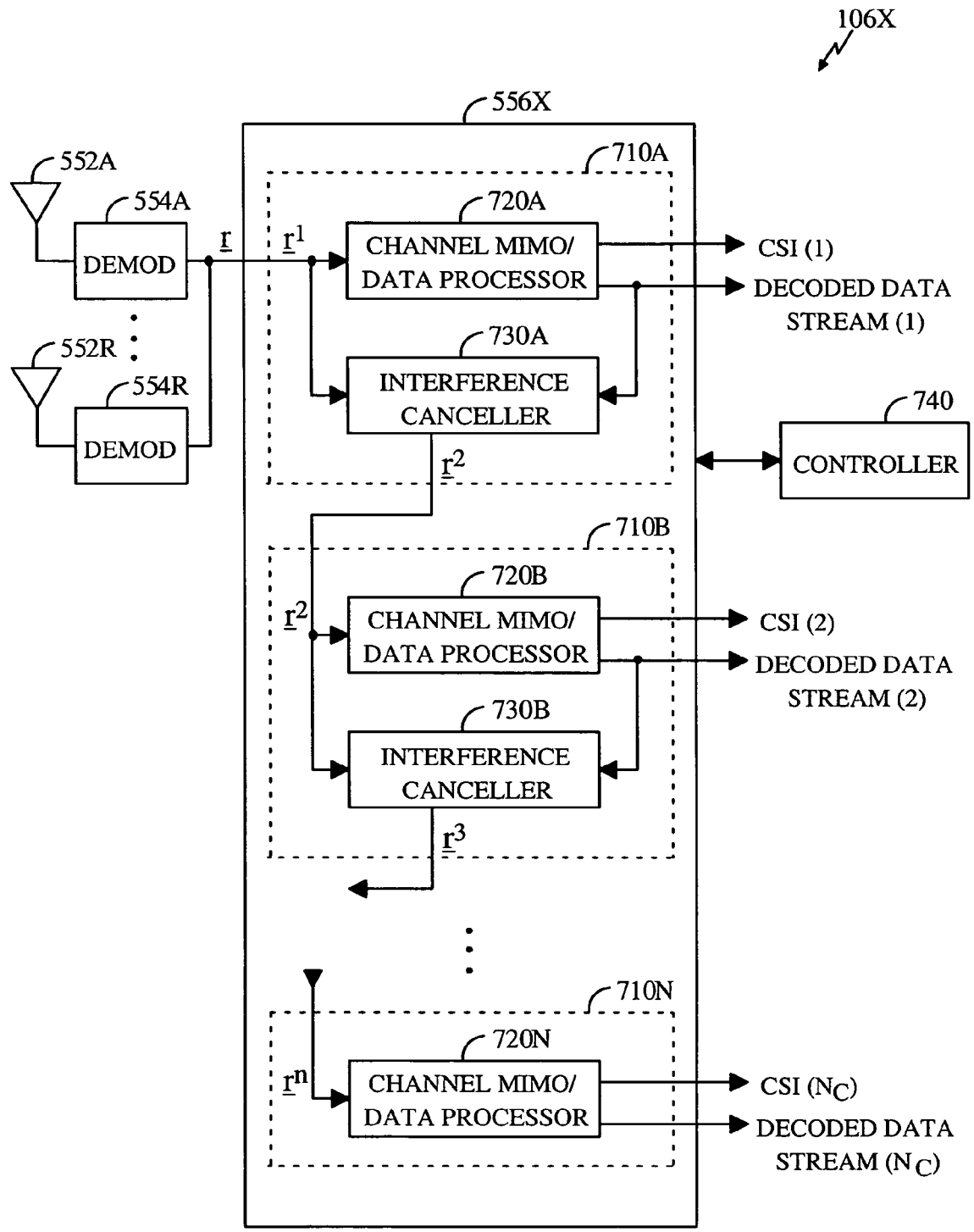
FIG. 7 is a block diagram of an embodiment of the receive portion of a terminal.

FIG. 7 is a block diagram of an embodiment of terminal 106x capable of implementing various aspects and embodiments of the invention. Terminal 106x is one embodiment of the receive portion of terminals 106a through 106n in FIG. 5 and implements the successive cancellation receiver processing technique to receive and recover the transmitted signals. The transmitted signals from (up to) $N_T$ transmit antennas are received by each of $N_R$ antennas 552a through 552r and routed to a respective demodulator (DEMOD) 554 (which is also referred to as a front-end processor). Each demodulator 554 conditions (e.g., filters and amplifies) a respective received signal, downconverts the conditioned signal to an intermediate frequency or baseband, and digitizes the downconverted signal to provide samples. Each demodulator 554 may further demodulate the samples with a received pilot to generate a stream of received modulation symbols, which is provided to a RX MIMO/data processor 556x.

In the embodiment shown in FIG. 7, RX MIMO/data processor 556x (which is one embodiment of RX MIMO/data processor 556 in FIG. 5) includes a number of successive (i.e., cascaded) receiver processing stages 710, one stage for each of the transmitted data stream to be recovered by terminal 106x. In one transmit processing scheme, one data stream is transmitted on each transmission channel assigned to terminal 106x, and each data stream is independently processed (e.g., with its own coding and modulation scheme) and transmitted from a respective transmit antenna. For this transmit processing scheme, the number of data streams is equal to the number of assigned transmission channels, which is also equal to the number of transmit antennas assigned for data transmission to terminal 106x (which may be a subset of the available transmit antennas). For clarity, RX MIMO/data processor 556x is described for this transmit processing scheme.

Each receiver processing stage 710 (except for the last stage 710n) includes a channel MIMO/data processor 720 coupled to an interference canceller 730, and the last stage 710n includes only channel MIMO/data processor 720n. For the first receiver processing stage 710a, channel MIMO/data processor 720a receives and processes the $N_R$ modulation symbol streams from demodulators 554a through 554r to provide a decoded data stream for the first transmission channel (or the first transmitted signal). And for each of the second through last stages 710b through 710n, channel MIMO/data processor 720 for that stage receives and processes the $N_R$ modified symbol streams from the interference canceller 720 in the preceding stage to derive a decoded data stream for the transmission channel being processed by that stage. Each channel MIMO/data processor 720 further provides CSI (e.g., the SNR) for the associated transmission channel.

For the first receiver processing stage 710a, interference canceller 730a receives the $N_R$ modulation symbol streams from all $N_R$ demodulators 554. And for each of the second through second-to-last stages, interference canceller 730 receives the $N_R$ modified symbol streams from the interference canceller in the preceding stage. Each interference canceller 730 also receives the decoded data stream from channel MIMO/data processor 720 within the same stage, and performs the processing (e.g., coding, interleaving, modulation, channel response, and so on) to derive $N_R$ remodulated symbol streams that are estimates of the interference components of the received modulation symbol streams due to this decoded data stream. The remodulated symbol streams are then subtracted from the received modulation symbol streams to derive $N_R$ modified symbol streams that include all but the subtracted (i.e., canceled) interference components. The $N_R$ modified symbol streams are then provided to the next stage.

In FIG. 7, a controller 740 is shown coupled to RX MIMO/data processor 556x and may be used to direct various steps in the successive cancellation receiver processing performed by processor 556x.

FIG. 7 shows a receiver structure that may be used in a straightforward manner when each data stream is transmitted over a respective transmit antenna (i.e., one data stream corresponding to each transmitted signal). In this case, each receiver processing stage 710 may be operated to recover one of the transmitted signals and provide the decoded data stream corresponding to the recovered transmitted signal. For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the transmitted signal on each transmit antenna of each frequency subchannel. Modulation symbols for multiple transmit antennas, frequency subchannels, and/or time intervals may then be combined in a complementary manner as the demultiplexing performed at the base station. The stream of combined modulation symbols is then processed to provide the corresponding decoded data stream.

Figure 8A:
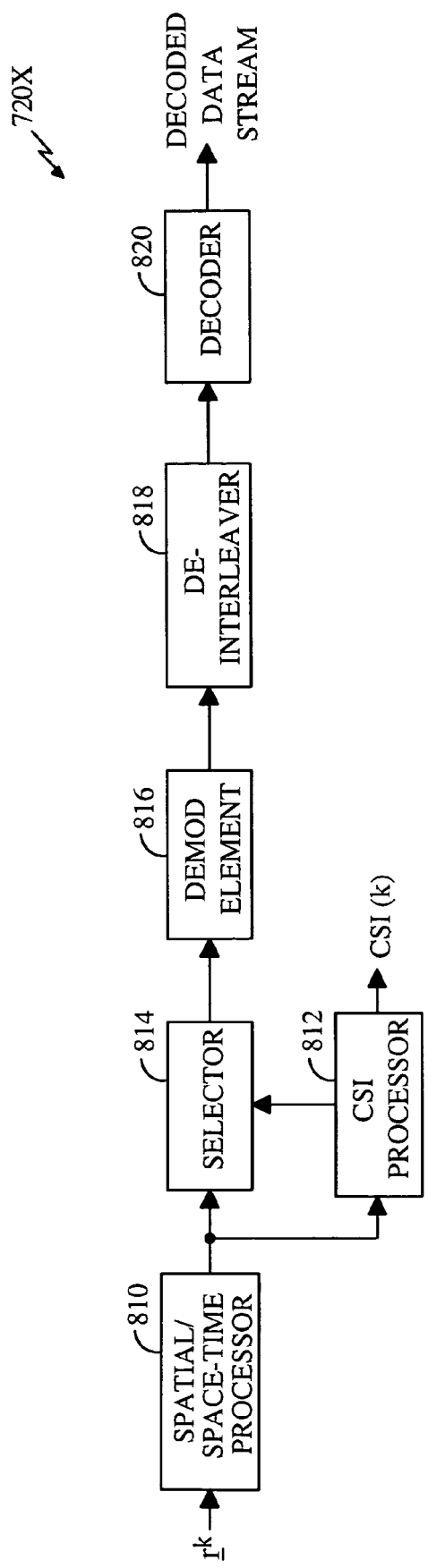
FIGS. 8A and 8B are block diagrams of an embodiment of a channel MIMO/data processor and an interference canceller, respectively, of a receive (RX) MIMO/data processor at the terminal.

FIG. 8A is a block diagram of an embodiment of channel MIMO/data processor 720x, which is one embodiment of channel MIMO/data processor 720 in FIG. 7. In this embodiment, channel MIMO/data processor 720x includes a spatial/space-time processor 810, a CSI processor 812, a selector 814, a demodulation element 818, a de-interleaver 818, and a decoder 820.

Spatial/space-time processor 810 performs linear spatial processing on the $N_R$ received signals for a non-dispersive MIMO channel (i.e., with flat fading) or space-time processing on the $N_R$ received signals for a dispersive MIMO channel (i.e., with frequency selective fading). The spatial processing may be achieved using linear spatial processing techniques such as a channel correlation matrix inversion (CCMI) technique, a minimum mean square error (MMSE) technique, and others. These techniques may be used to null out the undesired signals or to maximize the received SNR of each of the constituent signals in the presence of noise and interference from the other signals. The space-time processing may be achieved using linear space-time processing techniques such as a MMSE linear equalizer (MMSE-LE), a decision feedback equalizer (DFE), a maximum-likelihood sequence estimator (MLSE), and others. The CCMI, MMSE, MMSE-LE, and DFE techniques are described in further detail in the aforementioned U.S. patent application Ser. No. 09/854,235. The DFE and MLSE techniques are also described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

CSI processor 812 determines the CSI for each of the transmission channels used for data transmission. For example, CSI processor 812 may estimate a noise covariance matrix based on the received pilot signals and then compute the SNR of the k-th transmission channel used for the data stream to be decoded. The SNR can be estimated similar to conventional pilot assisted single and multi-carrier systems, as is known in the art. The SNR for all of the transmission channels used for data transmission may comprise the CSI that is reported back to the base station for this transmission channel. CSI processor 812 further provides to selector 814 a control signal that identifies the particular data stream to be recovered by this receiver processing stage.

Selector 814 receives a number of symbol streams from spatial/space-time processor 810 and extracts the symbol stream corresponding to the data stream to be decoded, as indicated by the control signal from CSI processor 812. The extracted stream of modulation symbols is then provided to a demodulation element 814.

For the embodiment shown in FIG. 6 in which the data stream for each transmission channel is independently coded and modulated based on the channel's SNR, the recovered modulation symbols for the selected transmission channel are demodulated in accordance with a demodulation scheme (e.g., M-PSK, M-QAM) that is complementary to the modulation scheme used for the transmission channel. The demodulated data from demodulation element 816 is then de-interleaved by a de-interleaver 818 in a complementary manner to that performed by channel interleaver 614, and the de-interleaved data is further decoded by a decoder 820 in a complementary manner to that performed by encoder 612. For example, a Turbo decoder or a Viterbi decoder may be used for decoder 820 if Turbo or convolutional coding, respectively, is performed at the base station. The decoded data stream from decoder 820 represents an estimate of the transmitted data stream being recovered.

Figure 8B:
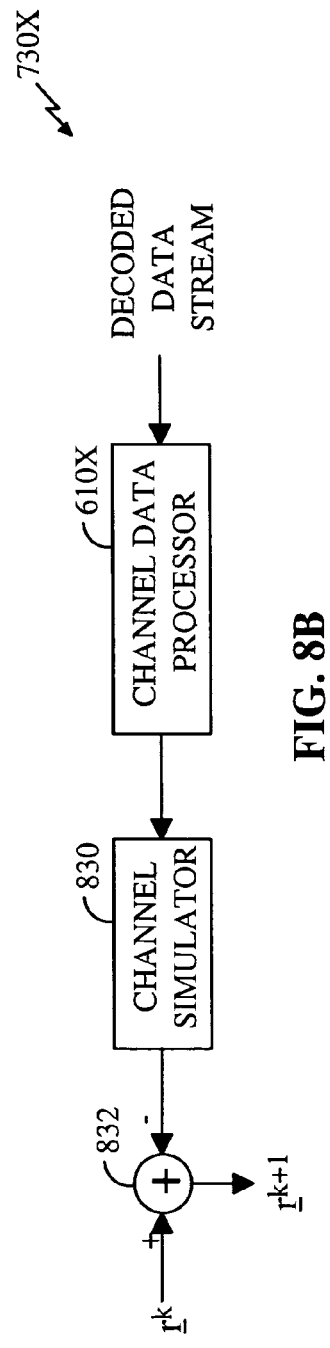

FIG. 8B is a block diagram of an interference canceller 730x, which is one embodiment of interference canceller 730 in FIG. 7. Within interference canceller 730x, the decoded data stream from the channel MIMO/data processor 720 within the same stage is re-encoded, interleaved, and re-modulated by a channel data processor 610x to provide remodulated symbols, which are estimates of the modulation symbols at the base station prior to the MIMO processing and channel distortion. Channel data processor 610x performs the same processing (e.g., encoding, interleaving, and modulation) as that performed at the base station for the data stream. The remodulated symbols are then provided to a channel simulator 830, which processes the symbols with the estimated channel response to provide estimates, $\hat{\imath}^k$, of the interference due the decoded data stream. The channel response estimate may be derived based on the pilot and/or data transmitted by the base station and in accordance with the techniques described in the aforementioned U.S. patent application Ser. No. 09/854,235.

The $N_R$ elements in the interference vector $\hat{\imath}^k$ correspond to the component of the received signal at each of the $N_R$ receive antennas due to symbol stream transmitted on the k-th transmit antenna. Each element of the vector represents an estimated component due to the decoded data stream in the corresponding received modulation symbol stream. These components are interference to the remaining (not yet detected) transmitted signals in the $N_R$ received modulation symbol streams (i.e., the vector $\underline{r}^k$), and are subtracted (i.e., canceled) from the received signal vector $\underline{r}^k$ by a summer 832 to provide a modified vector $\underline{r}^{k+1}$ having the components from the decoded data stream removed. The modified vector $\underline{r}^{k+1}$ is provided as the input vector to the next receiver processing stage, as shown in FIG. 7.

Various aspects of the successive cancellation receiver processing are described in further detail in the aforementioned U.S. patent application Ser. No. 09/854,235.

Receiver designs that do not employ the successive cancellation receiver processing technique may also be used to receive, process, and recover the transmitted data streams. Some such receiver designs are described in the aforementioned U.S. patent application Ser. Nos. 09/776,073 and 09/816,481, and U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, assigned to the assignee of the present invention and incorporated herein by reference.

For simplicity, various aspects and embodiments of the invention have been described wherein the CSI comprises SNR. In general, the CSI may comprise any type of information that is indicative of the characteristics of the communication link. Various types of information may be provided as CSI, some examples of which are described below.

In one embodiment, the CSI comprises signal-to-noise-plus-interference ratio (SNR), which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the CSI comprises signal power and interference plus noise power. These two components may be separately derived and provided for each transmission channel used for data transmission.

In yet another embodiment, the CSI comprises signal power, interference power, and noise power. These three components may be derived and provided for each transmission channel used for data transmission.

In yet another embodiment, the CSI comprises signal-to-noise ratio plus a list of interference powers for each observable interference term. This information may be derived and provided for each transmission channel used for data transmission.

In yet another embodiment, the CSI comprises signal components in a matrix form (e.g., $N_T \times N_R$ complex entries for all transmit-receive antenna pairs) and the noise plus interference components in matrix form (e.g., $N_T \times N_R$ complex entries). The base station may then properly combine the signal components and the noise plus interference components for the appropriate transmit-receive antenna pairs to derive the quality for each transmission channel used for data transmission (e.g., the post-processed SNR for each transmitted data stream, as received at the terminals).

In yet another embodiment, the CSI comprises a data rate indicator for each transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate is then mapped to and represented by a data rate indicator (DRI), which can be efficiently coded. For example, if (up to) seven possible data rates are supported by the base station for each transmit antenna, then a 3-bit value may be used to represent the DRI where, e.g., a zero may indicate a data rate of zero (i.e., don't use the transmit antenna) and 1 through 7 may be used to indicate seven different data rates. In a typical implementation, the quality measurements (e.g., SNR estimates) are mapped directly to the DRI based on, e.g., a look-up table.

In another embodiment, the CSI comprises power control information for each transmission channel. The power control information may include a single bit for each transmission channel to indicate a request for either more power or less power, or it may include multiple bits to indicate the magnitude of the change of power level requested. In this embodiment, the base station may make use of the power control information fed back from the terminals to adjust the data processing and/or the transmit power.

In yet another embodiment, the CSI comprises an indication of the particular processing scheme to be used at the base station for each transmit data stream. In this embodiment, the indicator may identify the particular coding scheme and the particular modulation scheme to be used for the transmit data stream such that the desired level of performance is achieved.

In yet another embodiment, the CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate to increase or decrease the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

Other forms of CSI may also be used and are within the scope of the invention. In general, the CSI includes sufficient information in whatever form that may be used to adjust the processing at the base station such that the desired level of performance is achieved for the transmitted data streams.

The CSI may be derived based on the signals transmitted from the base station and received at the terminals. In an embodiment, the CSI is derived based on a pilot reference included in the transmitted signals. Alternatively or additionally, the CSI may be derived based on the data included in the transmitted signals.

In yet another embodiment, the CSI comprises one or more signals transmitted on the uplink from the terminals to the base station. In some systems, a degree of correlation may exist between the uplink and downlink (e.g. time division duplexed (TDD) systems where the uplink and downlink share the same band in a time division multiplexed manner). In these systems, the quality of the downlink may be estimated (to a requisite degree of accuracy) based on the quality of the uplink, which may be estimated based on signals (e.g., pilot signals) transmitted from the terminals. The pilot signals would then represent a means for which the base station could estimate the CSI as observed at the terminals.

The signal quality may be estimated at the terminals based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Methods for estimating a single transmission channel based on a pilot signal or a data transmission may also be found in a number of papers available in the art. One such channel estimation method is described by F. Ling in a paper entitled "Optimal Reception, Performance Bound, and Cut-off-Rate Analysis of References-Assisted Coherent CDMA Communications with Applications," IEEE Transaction On Communication, October 1999.

Various types of information for CSI and various CSI reporting mechanisms are also described in U.S. Pat. No. 6,574,211, issued Jun. 3, 2003 to Padovani et al., entitled "METHOD AND APPARATUS FOR HIGH RATE PACKET DATA TRANSMISSION," filed Nov. 3, 1997, assigned to the assignee of the present application, and in "TIE/EIA/IS-856 cdma2000 High Rate Packet Data Air Interface Specification", both of which are incorporated herein by reference.

The CSI may be reported back to the base station using various CSI transmission schemes. For example, the CSI may be sent in full, differentially, or a combination thereof. In one embodiment, CSI is reported periodically, and differential updates are sent based on the prior transmitted CSI. In another embodiment, the CSI is sent only when there is a change (e.g., if the change exceeds a particular threshold), which may lower the effective rate of the feedback channel. As an example, the SNRs may be sent back (e.g., differentially) only when they change. For an OFDM system (with or without MIMO), correlation in the frequency domain may be exploited to permit reduction in the amount of CSI to be fed back. As an example for an OFDM system, if the SNR corresponding to a particular spatial subchannel for NM frequency subchannels is the same, the SNR and the first and last frequency subchannels for which this condition is true may be reported. Other compression and feedback channel error recovery techniques to reduce the amount of data to be fed back for CSI may also be used and are within the scope of the invention.

The elements of the base station and terminals may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the invention may be implemented with a combination of software and hardware. For example, the processing to schedule (i.e., select terminals and assign transmit antennas) may be performed based on program codes executed on a processor (scheduler 534 in FIG. 5).

Headings are included herein for reference and to aid in locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for scheduling data transmission in a wireless communication system, the method comprising:
   identifying one or more sets of terminals, each set including one or more terminals and corresponding to a hypothesis to be evaluated based on one or more criteria;
   assigning a plurality of transmit antennas to the one or more terminals in each set;
   evaluating performance of each hypothesis based on channel state information (CSI) associated with each terminal, the CSI being indicative of channel characteristics between the respective terminal and the corresponding transmit antennas; and
   selecting at least one set of terminals to receive data transmission based, at least in part, on the performance of each hypothesis.

2. The method of claim 1 further comprising:
   scheduling data transmission to the one or more terminals in the selected set.

3. The method of claim 1 wherein each hypothesis comprises a plurality of sub-hypotheses each of which corresponding to one or more specific assignments of the transmit antennas to the one or more terminals in the respective set and wherein the performance of each hypothesis is evaluated based on performance of the corresponding sub-hypotheses.

4. The method of claim 1, wherein the CSI for each terminal comprises signal-to-noise-plus-interference ratio (SNR) estimates derived at the respective terminal based on signals transmitted from the transmit antennas.

5. The method of claim 1, wherein the evaluating includes:
   computing a performance metric for each hypothesis as a function of throughput achievable by each terminal in the respective set.

6. The method of claim 1, wherein the plurality of transmit antennas are assigned to the one or more terminals in each set based on priority of terminals in the set.

7. The method of claim 6, wherein the priority of each terminal is determined based on one or more factors including quality of service (QoS) associated with the respective terminal.

8. An apparatus for managing data transmission in a wireless communication system, the apparatus comprising:
   means for identifying one or more sets of terminals, each set including one or more terminals and corresponding to a hypothesis to be evaluated based on one or more criteria;
   means for assigning a plurality of transmit antennas to the one or more terminals in each set;
   means for evaluating performance of each hypothesis based on channel state information (CSI) associated with each terminal, the CSI being indicative of channel characteristics between the respective terminal and the corresponding transmit antennas; and
   means for selecting at least one set of terminals to receive data transmission based, at least in part, on the performance of each hypothesis.

9. The apparatus of claim 8 further comprising:
   means for scheduling data transmission to the one or more terminals in the selected set.

10. The apparatus of claim 8 wherein each hypothesis comprises a plurality of sub-hypotheses each of which corresponding to one or more specific assignments of the transmit antennas to the one or more terminals in the respective set and wherein the performance of each hypothesis is evaluated based on performance of the corresponding sub-hypotheses.

11. The apparatus of claim 8, wherein the CSI for each terminal comprises signal-to-noise-plus-interference ratio (SNR) estimates derived at the respective terminal based on signals transmitted from the transmit antennas.

12. The apparatus of claim 8, wherein means for evaluating includes:

means for computing a performance metric for each hypothesis as a function of throuput achievable by each terminal in the respective set.

13. The apparatus of claim 8, wherein the plurality of transmit antennas are assigned to the one or more terminals in each set based on priority of terminals in the set.

14. The apparatus of claim 13, wherein the priority of each terminal is determined based on one or more factors including quality of service (QoS) associated with the respective terminal.

* * * * *